(12) United States Patent
Tanaka

(10) Patent No.: US 6,868,669 B2
(45) Date of Patent: Mar. 22, 2005

(54) EXHAUST-EMISSION PURIFYING APPARATUS AND METHOD FOR INTERNAL COMBUSTION ENGINE

(75) Inventor: Hiroshi Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 15 days.

(21) Appl. No.: 10/379,005

(22) Filed: Mar. 5, 2003

(65) Prior Publication Data

US 2003/0172647 A1 Sep. 18, 2003

(30) Foreign Application Priority Data

Mar. 15, 2002 (JP) ....................................... 2002-072829

(51) Int. Cl.$^7$ ................................................. F01N 3/00
(52) U.S. Cl. ............................. 60/286; 60/274; 60/277; 60/285; 60/295
(58) Field of Search .......................... 60/274, 276, 277, 60/285, 286, 295, 301

(56) References Cited

U.S. PATENT DOCUMENTS

| | | | | |
|---|---|---|---|---|
| 5,564,283 A | * | 10/1996 | Yano et al. .................... | 60/274 |
| 5,657,625 A | * | 8/1997 | Koga et al. .................... | 60/274 |
| 5,743,084 A | * | 4/1998 | Hepburn ....................... | 60/274 |
| 5,771,685 A | | 6/1998 | Hepburn | |
| 6,105,365 A | * | 8/2000 | Deeba et al. .................. | 60/274 |
| 6,134,883 A | * | 10/2000 | Kato et al. .................... | 60/274 |
| 6,182,444 B1 | * | 2/2001 | Fulton et al. .................. | 60/277 |
| 6,209,316 B1 | * | 4/2001 | Duvinage et al. .............. | 60/274 |
| 6,263,666 B1 | * | 7/2001 | Kubo et al. .................... | 60/277 |
| 6,341,487 B1 | * | 1/2002 | Takahashi et al. ............. | 60/286 |
| 6,347,513 B2 | * | 2/2002 | Pfleger et al. ................. | 60/277 |
| 2001/0054282 A1 | | 12/2001 | Lang et al. | |

FOREIGN PATENT DOCUMENTS

| | | |
|---|---|---|
| DE | 100 03 612 A1 | 8/2001 |
| EP | 0 943 786 A2 | 9/1999 |
| EP | 1 174 600 A2 | 1/2002 |
| FR | 2 807 473 A1 | 10/2001 |
| JP | A 6-66129 | 3/1994 |
| JP | A 2000-303825 | 10/2000 |
| JP | A 2001-082131 | 3/2001 |

\* cited by examiner

Primary Examiner—Tu M. Nguyen
(74) Attorney, Agent, or Firm—Oliff & Berridge, PLC

(57) ABSTRACT

An exhaust-emission purifying apparatus for an internal combustion engine, includes an NOx purifying catalyst disposed in an exhaust system of the engine to purify NOx in an exhaust emission of the engine, and hold a specific substance (in addition to NOx) in the exhaust emission by adsorption or absorption of the specific substance. A controller is operable to detect an NOx purifying ability of the NOx purifying catalyst which is lowered with an increase in the amount of the specific substance held by the catalyst. The controller compares the detected NOx purifying ability with a predetermined threshold value to determine whether the catalyst has been poisoned with the specific substance. When the controller determines that the catalyst has been poisoned with the specific substance, the controller commands at least the engine to effect a poisoning removing treatment of the catalyst, for releasing the specific substance from the catalyst. The threshold value is varied, for example, based upon the operating condition of the engine.

33 Claims, 7 Drawing Sheets

EXHAUST-EMISSION PURIFYING APPARATUS AND METHOD FOR INTERNAL COMBUSTION ENGINE

INCORPORATION BY REFERENCE

The disclosure of Japanese Patent Application No. 2002-072829 filed on Mar. 15, 2002, including the specification, drawings and abstract is incorporated herein by reference in its entirety.

BACKGROUND OF THE INVENTION

1. Field of Invention

The present invention relates in general to purification of an exhaust emission from an internal combustion engine, and more particularly to an apparatus and a method which permit efficient recovery of an original exhaust-emission purifying ability of a catalyst used for purifying the exhaust emission of the internal combustion engine, after the ability has been lowered due to absorption or adsorption of specific substances contained in the exhaust emission.

2. Description of Related Art

As one example of NOx purifying catalysts whose exhaust-emission purifying ability is lowered due to absorption or adsorption of specific substances contained in the exhaust emission, there is known an NOx occlusion-reduction catalyst which is capable of selectively occluding and holding nitrogen oxides (NOx) contained in the exhaust emission, by adsorption and/or absorption of the NOx, when the exhaust emission to which the catalyst is exposed has a fuel-lean air/fuel ratio, and is capable of reducing the occluded NOx, by using a reducing component contained in the exhaust emission, when the exhaust emission has a stoichiometric or fuel-rich air/fuel ratio. Like the NOx, sulfur oxides (SOx) also present in the exhaust emission are occluded, by adsorption or absorption, in the NOx occlusion-reduction catalyst. Unlike the NOx, however, the SOx occluded in the NOx occlusion-reduction catalyst cannot be released from the NOx occlusion-reduction catalyst at a temperature near a temperature of reduction of the NOx, even when the exhaust emission has a stoichiometric or fuel-rich air/fuel ratio. Accordingly, the amount of the SOx occluded in the NOx occlusion-reduction catalyst gradually increases with an increase in the cumulative operating time of the internal combustion engine.

An increase in the amount of the SOx occluded in and held by the NOx occlusion-reduction catalyst reduces the volume of a portion of the catalyst in which the NOx can be occluded. In other words, the increase in the amount of the SOx occluded in and held by the NOx occlusion-reduction catalyst lowers the NOx occluding (purifying) ability of the NOx occlusion-reduction catalyst, causing an increase in the amount of NOx that is not occluded in the catalyst and merely passed through the catalyst, namely, an increase in the amount of NOx that is left in the exhaust emission to be discharged into the atmosphere, without purification by the catalyst. In the present specification, a phenomenon of reduction of the NOx occluding ability of the catalyst due to occlusion of the SOx, that is, a phenomenon of reduction of the NOx purifying ability of the NOx occlusion-reduction catalyst will be referred to as "SOx poisoning" of the NOx occlusion-reduction catalyst. Namely, the NOx occlusion-reduction catalyst is poisoned by adsorption or absorption of specific substances in the form of sulfur oxides contained in the exhaust emission, so that its exhaust-emission purifying ability is lowered.

The NOx purifying ability of the NOx occlusion-reduction catalyst which has been lowered due to occlusion of SOx can be increased back to its original ability, by releasing the occluded SOx from the NOx occlusion-reduction catalyst. To release the occluded SOx from the NOx occlusion-reduction catalyst, however, the catalyst should be treated to remove the SOx poisoning under conditions different from those used for usual reduction of NOx by the NOx occlusion-reduction catalyst. That is, the temperature of the exhaust emission must be raised to a level higher than the temperature of the usual NOx reduction, as well as controlling the air/fuel ratio of the exhaust emission to be stoichiometric or slightly fuel-rich, as in the usual NOx reduction.

JP-A-6-66129 discloses an example of an exhaust-emission purifying apparatus for an internal combustion engine, which is arranged to effect such a treatment of the NOx occlusion-reduction catalyst so as to remove the SOx poisoning.

The exhaust-emission purifying apparatus disclosed in the above-identified publication uses an NOx occlusion-reduction catalyst which is disposed in an exhaust passage of the internal combustion engine and which is capable of selectively occluding and holding NOx contained in the exhaust emission, by adsorption and/or absorption of the NOx, when the incident exhaust emission has a fuel-lean air/fuel ratio, and is capable of reducing the occluded NOx, by using a reducing component contained in the exhaust emission, when the incident exhaust emission has a stoichiometric or fuel-rich air/fuel ratio. The apparatus is arranged to estimate the amount of sulfur oxides (SOx) absorbed in the NOx occlusion-reduction catalyst, and initiate the treatment of the NOx occlusion-reduction catalyst to remove the SOx poisoning, when the estimated amount of SOx absorbed in the catalyst has increased to a predetermined upper limit. This SOx-poisoning removing treatment is effected by activating an electric heater provided on the NOX occlusion-reduction catalyst to raise the temperature of the catalyst, and changing the air/fuel ratio of an air-fuel mixture supplied to the engine, to the stoichiometric value, so that the NOx occlusion-reduction catalyst is exposed to the exhaust emission having the stoichiometric air/fuel ratio. According to this arrangement, the exhaust emission to which the NOx occlusion-reduction catalyst is exposed has a higher temperature and a lower air/fuel ratio, than in the normal operation of the exhaust-emission purifying apparatus, so that the sulfur oxides (SOx) occluded in the NOx occlusion-reduction catalyst are released from the catalyst, whereby the original NOx purifying ability of the NOx occlusion-reduction catalyst is recovered.

However, the apparatus disclosed in the above-indicated publication JP-A-6-66129 has a drawback in that the SOx-poisoning removing treatment of the catalyst cannot be efficiently effected.

The NOx occlusion-reduction catalyst with a certain amount of SOx occluded therein may or may not perform its function without a problem, depending upon the condition of the catalyst, for example, the operating condition of the engine.

For instance, the rate (mg/sec) of emission of NOx from an engine increases with an increase in the load acting on the engine. Therefore, when the engine is operated with a comparatively high load acting thereon, the NOx occlusion-reduction catalyst is not able to remove the entire amount of NOx contained in the exhaust emission, causing an increase in the amount of NOx that is not occluded in the catalyst and passed through the catalyst, even where the amount of reduction of the NOx occluding ability of the catalyst is comparatively small, i.e., a comparatively small amount of SOx is occluded in the catalyst.

When the engine is operated under a comparatively low load, the amount of emission of the NOx from the engine is relatively small. In this case, therefore, the NOx occlusion-reduction catalyst may be sufficiently able to remove the entire amount of NOx contained in the exhaust emission, even where the amount of SOx occluded in the catalyst would prevent the catalyst from having a sufficiently high NOx purifying ability if the engine is operated under a comparatively high load.

Thus, the NOx occlusion-reduction catalyst having a certain amount of SOx occluded therein may suffer from an insufficient NOx purifying ability in an operation of the engine under a comparatively high load, but have a sufficiently high NOx purifying ability in an operation of the engine under a comparatively low load.

The apparatus disclosed in the above-indicated publication JP-A-6-66129 is arranged such that the SOx-poisoning removing treatment of the NOx occlusion-reduction catalyst is initiated when the amount of SOx occluded in the catalyst has reached a predetermined limit which is held constant irrespective of the operating condition of the engine. For the reason described above, this arrangement does not permit sufficiently high efficiency of the SOx-poisoning removing treatment.

If the limit of the NOx purifying ability of the NOx occlusion-reduction catalyst at which the SOx-poisoning removing treatment of the catalyst is initiated is set to be a comparatively small value suitable for a high-load operation of the engine, the SOx-poisoning removing treatment is unnecessarily initiated even when the catalyst actually has a sufficiently high NOx purifying ability for the engine operated under a comparatively low load for a relatively long time. This results in a problem of an increased amount of fuel consumption by the engine.

If the limit of the NOx purifying ability of the catalyst at which the SOx-poisoning removing treatment is initiated is set to be a comparatively large value suitable for a low-load operation of the engine, the SOx-poisoning removing treatment is not initiated even after the NOx purifying ability of the NOx occlusion-reduction catalyst has actually become insufficient for the engine operated under a comparatively high load. This results in a continuing operation of the engine with a deteriorated state of the exhaust emission.

SUMMARY OF THE INVENTION

The present invention was made in view of the problems discussed above. It is therefore one object of the present invention to achieve purification of an exhaust emission from an internal combustion engine, while preventing an increase in the amount of fuel consumption and deterioration of the exhaust emission of the engine, by efficiently effecting a treatment of an NOx occlusion-reduction catalyst to remove SOx poisoning of the catalyst.

The above object may be achieved according to a first aspect of this invention, which provides an exhaust-emission purifying apparatus for an internal combustion engine, comprising:

an NOx purifying catalyst disposed in an exhaust system of the internal combustion engine, and operable to purify NOx contained in an exhaust emission from the internal combustion engine and hold a specific substance in the exhaust emission by adsorption or absorption of the specific substance, an NOx purifying ability of the NOx purifying catalyst to purify the NOx being lowered with an increase in an amount of the specific substance held by the catalyst; and a controller operable to detect the NOx purifying ability of the NOx purifying catalyst, wherein the controller is operable to compare the detected NOx purifying ability with a predetermined threshold value, to determine whether the NOx purifying catalyst has been poisoned with the specific substance, and commands at least the internal combustion engine to effect a poisoning removing treatment of the NOx purifying catalyst, for releasing the specific substance from the NOx purifying catalyst, when the controller determines that the NOx purifying catalyst has been poisoned with the specific substance, the predetermined threshold value being changed (or variable) based upon an operating condition of the internal combustion engine.

The object indicated above may also be achieved according to a second aspect of this invention, which provides an exhaust-emission purifying method comprising the steps of:

detecting an operating condition of the internal combustion engine, on the basis of an amount of fuel injection into the internal combustion engine and an operating speed of the internal combustion engine;

determining a threshold value used to determine whether an NOx purifying catalyst has been poisoned with a specific substance contained in an exhaust emission from the internal combustion engine, such that the threshold value is changed (or variable) based upon the detected operating condition of the internal combustion engine;

comparing an NOx purifying ability of the NOx purifying catalyst to purify NOx contained in the exhaust emission with the threshold value, to determine whether the NOx purifying catalyst has been poisoned with the specific substance; and releasing the specific substance from the NOx purifying catalyst when it is determined that the NOx purifying catalyst has been poisoned with the specific substance.

While the internal combustion engine is operated in an operating state in which the engine load and speed are comparatively high, the rate of generation of NOx by the engine is comparatively high. In this operating condition, therefore, the amount of NOx not purified by the NOx purifying catalyst and discharged downstream of the catalyst is comparatively large, even when the NOx purifying catalyst has a comparatively high NOx purifying ability while the amount of the specific substance held by the catalyst is comparatively small. In the high-load high-speed operating state of the engine, therefore, the above-indicated threshold value of the NOx purifying ability is set to be comparatively small, so that the poisoning removing treatment of the NOx purifying catalyst is performed even when the NOx purifying ability is still comparatively high.

While the internal combustion engine is operated in an operating state in which the engine load and speed are comparatively low, on the other hand, the rate of generation of NOx by the engine is comparatively low. In this operating condition, therefore, the NOx purifying catalyst is able to purify the NOx in the exhaust emission, even when the NOx purifying catalyst has a comparatively low NOx purifying ability. In the low-load low-speed operating state of the engine, therefore, the above-indicated threshold value of the NOx purifying ability is set to be comparatively large, so that the poisoning removing treatment of the NOx purifying catalyst is not performed until the NOx purifying ability has been lowered by a considerable amount.

Thus, the threshold value used to determine the NOx purifying ability is set for each of different operating states of the internal combustion engine, so that the poisoning removing treatment of the NOx purifying catalyst is effected only when the treatment is necessary in the present operating condition of the engine. Accordingly, the present. invention permits the NOx purifying catalyst to be efficiently treated to remove its poisoning with the specific substance, while preventing an increase in the amount of consumption of a fuel by the engine and deterioration of the exhaust emission from the engine.

BRIEF DESCRIPTION OF THE DRAWINGS

The above and other objects, features, advantages, and technical and industrial significance of this invention will be better understood by reading the following detailed description of preferred embodiments of the invention, when considered in connection with the accompanying drawings, in which.

DETAILED DESCRIPTION OF PREFERRED EMBODIMENTS

Exemplary embodiments of the present invention will be described in detail by reference to the accompanying drawings.

Figure 1:
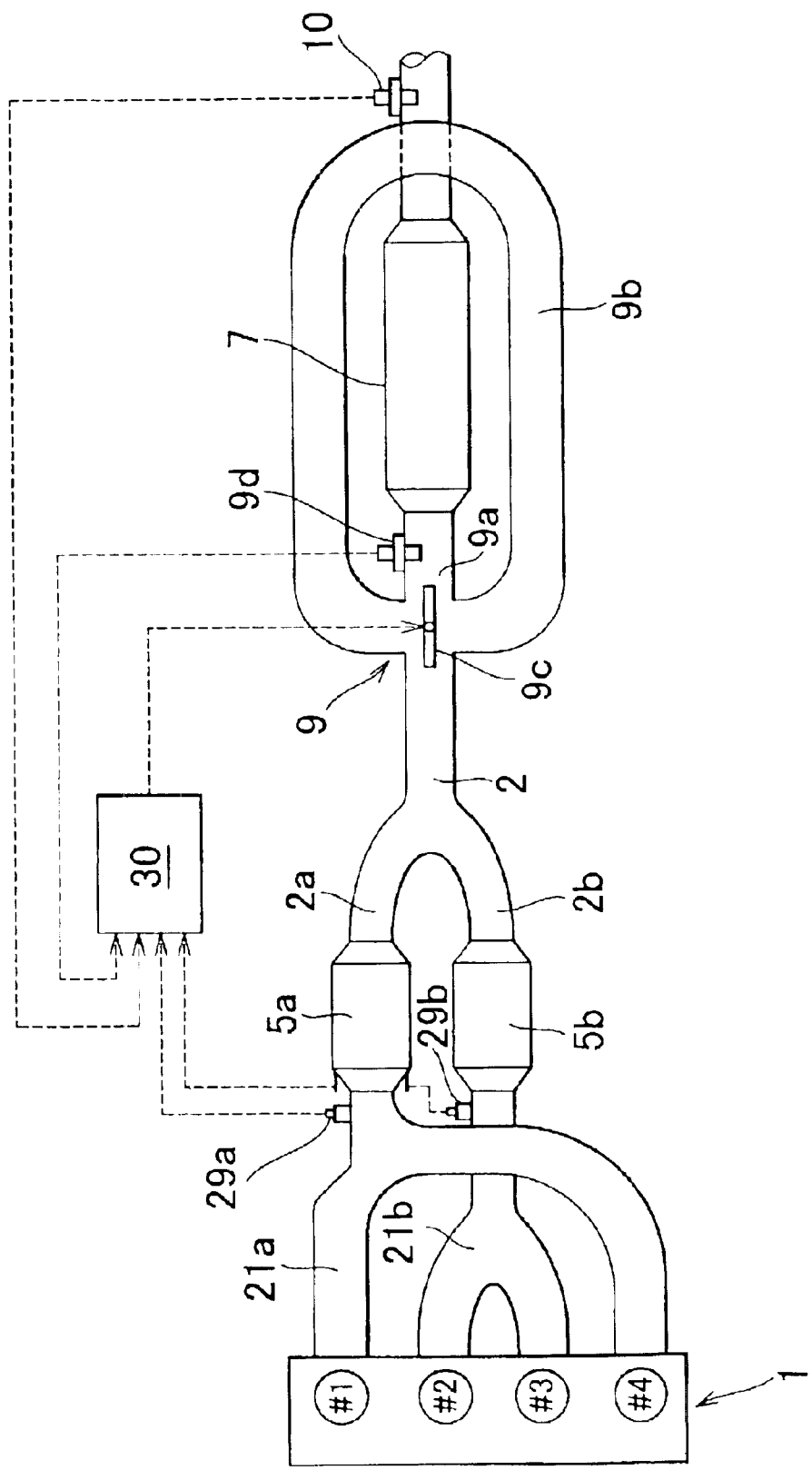
FIG. 1 is a view schematically illustrating a first embodiment of this invention as applied to an internal combustion engine for an automotive vehicle.

Referring first to the schematic view of FIG. 1, there is shown a part of an automotive vehicle which includes an internal combustion engine and incorporates one embodiment of this invention as applied to the engine.

In FIG. 1, reference numeral 1 denotes the internal combustion engine of the automotive vehicle. The internal combustion engine 1 to which the present embodiment is applied is a four-cylinder gasoline engine having four cylinders #1 through #4. However the number of the cylinders is not limited to four. Each cylinder is provided with a fuel injector valve (not shown) built therein for direct injection of a fuel into the cylinder. The present internal combustion engine 1 is operable over a wide range of an air/fuel ratio of an air-fuel mixture, from a fuel-lean ratio higher than the stoichiometric value, to a fuel-rich ratio lower than the stoichiometric value.

The four cylinders #1 through #4 are grouped into two groups each consisting of two cylinders which do not have successive ignition timings. In the present embodiment, the ignition takes place in the order of the first, third, fourth and second cylinders #1, #3, #4 and #2, and the first and fourth cylinders #1 and #4 constitute a first group, while the second and third cylinders #2 and #3 constitute a second group. Exhaust ports of the two cylinders of each group are connected to an exhaust manifold connected to an exhaust passage. Namely, the exhaust ports of the two cylinders #1, #4 of the first group are connected to a first exhaust manifold 21a connected a first branch exhaust passage 2a, while the exhaust ports of the two cylinders #2, #3 of the second group are connected to a second exhaust manifold 21b connected a second branch exhaust passage 2b, as shown in FIG. 1. In the present engine 1, the first and second branch exhaust passages 2a, 2b are provided with respective start catalysts (hereinafter abbreviated as "SC") 5a, 5b, which are three-way catalysts known in the art. The two branch exhaust passages 2a, 2b merge into a common exhaust passage 2, at their downstream ends located downstream of the SC 5a, 5b.

In FIG. 1, reference signs 29a and 29b denote air/fuel-ratio sensors disposed on the respective first and second branch exhaust passages 2a, 2b, on the upstream side of the respective start catalysts 5a, 5b. The air/fuel-ratio sensors 29a, 29b generate output signals in the form of voltage signals corresponding to the air/fuel ratio of an exhaust emission from the engine 1, over a wide range of the ratio, and the output signals are used for controlling the air/fuel ratio of the air-fuel mixture to be supplied to the engine 1.

The common exhaust passage 2 connected to the two branch exhaust passages 2a, 2b is provided with an NOx occlusion-reduction catalyst 7, which is capable of selectively holding (occluding) nitrogen oxides (NOx) contained in the exhaust emission, by adsorption and/or absorption of the NOx, when the exhaust emission to which the catalyst is exposed has a fuel-lean air/fuel ratio, and is capable of reducing the occluded NOx, by using a reducing component contained in the exhaust emission, when the exhaust emission has a stoichiometric or fuel-rich air/fuel ratio.

Reference numeral 9b in FIG. 1 denotes a U-shaped exhaust pipe serving as a cooling exhaust passage for lowering the temperature of the exhaust emission flowing into the NOx occlusion-reduction catalyst 7. The U-shaped exhaust pipe 9b is bent into a U shape and connected at its opposite ends to an inlet portion of the common exhaust passage 2 through which the exhaust emission enters the NOx occlusion-reduction catalyst 7, so that the U-shaped exhaust pipe 9b takes the form of a loop.

At a connection 9 between the inlet portion 9a and the U-shaped exhaust pipe 9b, there is disposed a switch valve 9c, which is operable between a first position at which the exhaust emission flows into the NOx occlusion-reduction catalyst 7 through the U-shaped exhaust pipe 9b, and a second position at which the exhaust emission flows into the NOx occlusion-reduction catalyst 7 directly through the inlet portion 9a. As described below, the switch valve 9c is used for adjusting the temperature of the NOx occlusion-reduction catalyst 7.

Reference numeral 30 in FIG. 1 denotes an electronic control unit (ECU) for effecting basic controls of the engine 1, such as a fuel injection control and an ignition timing control. The ECU 30 is a known microcomputer incorporating a random-access memory (RAM), a read-only memory (ROM) and a central processing unit (CPU), which are interconnected to each other through a bi-directional bus. In the present embodiment, the ECU 30 is arranged to perform a known NOx reducing operation and effect an SOx-poisoning removing treatment of the NOx occlusion-reduction catalyst 7, as well to effect the basic controls described above. The NOx reducing operation is performed to reduce the NOx occluded in the NOx occlusion-reduction catalyst 7, in response to an increase in the amount of the NOx occluded in the catalyst 7, by operating the engine 1 at the stoichiometric or fuel-rich air/fuel ratio for a relatively short time. The SOx-poisoning removing treatment is effected, as described below, to recover the NOx purifying ability of the NOx occlusion-reduction catalyst 7 when the ability has been lowered due to occlusion of SOx in the catalyst 7 (due to SOx poisoning).

To effect the controls of the engine 1 and perform or effect the NOx reducing operation and SOx-poisoning removing treatment of the catalyst 7, the ECU 30 has input ports for receiving various parameters indicative of an operating state of the internal combustion engine 1, such as a quantity of an intake air, an operating speed, a temperature of a cooling water and an angle of operation of an accelerator pedal (an angle of opening of a throttle valve), which are detected by respective sensors (not shown), and a temperature TEX of the exhaust emission entering the NOx occlusion-reduction catalyst 7, which temperature TEX is represented by an output signal of an exhaust-emission temperature sensor 9d disposed on the inlet portion 9a of the common exhaust passage 2.

The ECU 30 also has output ports connected to the fuel injector valves and spark plugs (not shown), and an output port connected to an actuator (not shown) of the above-indicated switch valve 9c, for controlling the switch valve 9c.

The present embodiment uses an NOx sensor 10 disposed on a portion of the common exhaust passage 2 which is located on the downstream side of the NOx occlusion-reduction catalyst 7. The NOx sensor 10 is arranged to detect the concentration of NOx contained in the exhaust emission flowing through the above-indicated portion of the common exhaust passage 2. An output signal of the NOx sensor 10 indicative of the NOx concentration is fed to the ECU 30. The NOx sensor 10 used in the present embodiment is of a type incorporating a reducing catalyst and operable to reduce NOx (NO, NO$_2$) contained in the exhaust emission, by a reaction NO→(1/2)N$_2$+(1/2)O$_2$, or NO$_2$→(1/2)N$_2$+O$_2$, and detect the amount of oxygen generated by the reduction, for thereby calculating the concentration of the NOx in the exhaust emission.

As described above, the NOx occlusion-reduction catalyst 7 is operable to selectively occlude NOx in the exhaust emission when the incident exhaust emission has a fuel-lean air/fuel ratio, and reduces the occluded NOx into N$_2$, by using a reducing substance contained in the exhaust emission when the exhaust emission has a stoichiometric or fuel-rich air/fuel ratio. The present internal combustion engine is operable over a wide range of the air/fuel ratio from a fuel-lean value to a fuel-rich value, and is controlled to be operated at a fuel-lean air/fuel ratio in most of its operating states, except in a considerably high-load state.

In a lean-burn operation of the engine 1, the NOx contained in the exhaust emission flowing through the NOx occlusion-reduction catalyst 7 is occluded in the NOx occlusion-reduction catalyst 7 and thus removed from the exhaust emission. As the lean-burn operation continues, the amount of NOx occluded in the NOx occlusion-reduction catalyst 7 gradually increases toward an upper limit (maximum amount that can be occluded in the catalyst 7). After the amount of NOx occluded in the NOx occlusion-reduction catalyst 7 has reached the maximum amount, that is, after the catalyst 7 has been saturated with the NOx and can no longer occlude NOx, the NOx in the exhaust emission is merely passed through the catalyst 7, without occlusion in the catalyst 7. Even before the maximum amount of occlusion of NOx has been reached, the NOx purifying ability of the catalyst 7 is lowered or reduced so that the amount of NOx passed through the catalyst 7 without occlusion in the catalyst 7 as the NOx occluded in the catalyst 7 increases toward the maximum amount. Accordingly, the exhaust emission is gradually deteriorated.

The theoretical maximum amount of NOx occlusion of the NOx occlusion-reduction catalyst 7 is determined by the composition and volume of the catalyst 7. In view of this, the present embodiment is arranged to estimate the amount of NOx occluded in the NOx occlusion-reduction catalyst 7 during the lean-burn operation of the engine 1, and initiate the operation to reduce the NOx occluded in the catalyst 7 by performing a so-called "rich spike" operation of the engine 1 for a short time when the estimated amount of NOx has increased to a predetermined ratio of the theoretical maximum amount of NOx occlusion. In the rich-spike operation, the engine 1 is operated at the stoichiometric or fuel-rich air/fuel ratio.

By performing the rich-spike operation, the NOx occluded in the NOx occlusion-reduction catalyst 7 is released in the form of N$_2$, and the amount of NOx occlusion is almost zeroed, so that the original NOx purifying ability of the catalyst 7 is recovered.

The exhaust emission from the engine 1 usually also contains sulfur oxides (SOx) produced as a result of combustion of a small amount of sulfur component contained in the fuel and a lubricating oil used for the engine. Like the NOx, the SOx in the exhaust emission is occluded in the NOx occlusion-reduction catalyst 7 during the lean-burn operation of the engine 1, and released as SOx from the catalyst 7 during the rich-burn operation of the engine 1. Although the NOx can be reduced into N2 at a comparatively low temperature by lowering the air/fuel ratio to the stoichiometric value or lower, the SOx cannot be released from the NOx occlusion-reduction catalyst 7 unless the temperature of the catalyst 7 is higher than the temperature at which the NOx reduction can usually take place.

Accordingly, substantially no amount of SOx occluded in the NOx occlusion-reduction catalyst 7 can be released from the catalyst 7 by the rich-spike operation of the engine 1 usually performed to reduce the occluded NOx, so that the amount of SOx occluded in the catalyst 7 increases with time.

In the presence of SOx occluded in the NOx occlusion-reduction catalyst 7, the maximum amount of NOx that can be occluded in the catalyst 7 decreases by an amount corresponding to the amount of the SOx in the catalyst 7. In other words, the maximum amount of NOx that can be actually occluded in the NOx occlusion-reduction catalyst 7 decreases with an increase in the amount of SOx occluded in the catalyst 7. Accordingly, as the amount of SOx occluded in the NOx occlusion-reduction catalyst 7 increases, the NOx occluding ability of the NOx occlusion-reduction catalyst 7 is lowered, causing an increase in the ratio of NOx not occluded in the catalyst 7 and merely passed through the catalyst 7, so that the exhaust emission discharged from the exhaust passage 2 is deteriorated even if the amount of the NOx occluded in the catalyst 7 is comparatively small. As described above, the phenomenon of reduction of the NOx occluding ability of the NOx occlusion-reduction catalyst 7 due to an increase of SOx occluded in the catalyst 7 is referred to as SOx poisoning.

As described below, the present embodiment is arranged to detect the NOx occluding ability of the NOx occlusion-reduction catalyst 7, and determine that the NOx occlusion-reduction catalyst 7 suffers from the SOx poisoning, when the detected NOx occluding ability of the catalyst 7 has been lowered to a predetermined lower limit. Upon determination that the NOx occlusion-reduction catalyst 7 suffers from the SOx poisoning, the SOx-poisoning removing treatment of the catalyst 7 is effected to release the occluded SOx from the catalyst 7.

To release the occluded SOx from the NOx occlusion-reduction catalyst 7, the temperature of the catalyst 7 must be made higher than that in the usual rich-spike operation for reducing the NOx. In the present embodiment, the SOx-poisoning removing treatment of the NOx occlusion-reducing catalyst 7 is effected by increasing the temperature of the catalyst 7 to a level at which the SOx can be released, while the air/fuel ratio of the exhaust emission entering the catalyst 7 is held at the stoichiometric value or a slightly fuel-rich value. This SOx-poisoning removing treatment permits recovery of the original NOx occluding ability of the NOx occlusion-reduction catalyst 7, and prevents deterioration of the exhaust emission.

The SOx-poisoning removing treatment or operation requiring a change of the air-fuel mixture of the engine 1 to a fuel-rich state and a rise of the temperature of the exhaust emission results in an increase in the required amount of consumption of the fuel by the engine 1. In this respect, it is desirable to minimize the frequency of performance of the SOx-poisoning removing treatment. In the apparatus disclosed in the publication JP-A-6-66129, the SOx-poisoning removing treatment of the NOx occlusion-reduction catalyst is effected each time the estimated amount of SOx occluded in the catalyst has increased to a predetermined constant upper limit. Since the constant upper limit is used, there is a risk that the SOx-poisoning removing treatment is unnecessarily effected.

The NOx occluding ability of the NOx occlusion-reduction catalyst decreases with an increase in the amount of SOx occluded in the catalyst. When the amount of NOx generated by the engine is relatively small, for example, the catalyst is able to sufficiently purify the exhaust emission even if the NOx occluding ability is relatively low. On the other hand, the catalyst becomes unable to occlude the entire amount of NOx in the exhaust emission, even with a small amount of decrease in the NOx occluding ability of the catalyst, when the amount of NOx generated by the engine is relatively large. However, the catalyst is able to occlude the entire amount of NOx in the exhaust emission even if the NOx occluding ability is comparatively low, when the amount of NOx generated by the engine is comparatively small.

When the upper limit of the amount of SOx at which the SOx-poisoning removing treatment is initiated is set irrespective of a change in the actual operating condition of the engine, for instance, is fixed at a value suitable to an operating condition in which the amount of NOx generated by the engine is relatively large, the SOx-poisoning removing treatment of the NOx occlusion-reduction catalyst is initiated upon determination that the catalyst suffers from the SOx poisoning, even if the catalyst is still able to sufficiently function to occlude the NOx, while the amount of the NOx actually generated by the engine is comparatively small.

When the upper limit of the amount of SOx at which the SOx-poisoning removing treatment is initiated is fixed at a value suitable to an operating condition in which the amount of NOx generated by the engine is relatively small, the SOx-poisoning removing treatment is not initiated even when this treatment is required while the engine is operated in a condition in which the amount of NOx generated is comparatively large. In this case, the NOx is not occluded in the NOx occlusion-reduction catalyst and merely passed through the catalyst.

The present embodiment functions such that a threshold value in the form of the upper limit of the amount of SOx occluded in the NOx occlusion-reduction catalyst at which the SOx-poisoning removing treatment or operation is initiated is determined according to the operating state of the engine 1 (the amount or rate of generation of NOx by the engine 1), and such that the SOx-poisoning removing treatment of the catalyst is initiated upon determination that the catalyst suffers from the SOx poisoning, when the estimated amount of SOx occluded in the catalyst has increased or reached the thus determined upper limit.

This arrangement assures that the SOx-poisoning removing treatment of the NOx occlusion-reduction catalyst is effected only when there is a high possibility of deterioration of the exhaust emission due to actual lowering of the NOx occluding ability of the catalyst relative to the operation of the engine. Thus, the present arrangement is effective to prevent an unnecessary increase in the amount of consumption of the fuel by the engine 1.

There will be discussed exemplary arrangements according to the present invention, regarding (1) the determination according to the operating condition of the engine 1, of the SOx-poisoning threshold value (lower limit or threshold value of the NOx purifying ability of the catalyst 7 at which the SOx-poisoning removing treatment of the catalyst 7 is initiated), (2) the method of determining that the catalyst 7 suffers from SOx poisoning, and (3) the SOx-poisoning removing treatment of the catalyst 7.

(1) Determination of the SOx-poisoning Threshold Value

First, the determination of the SOx-poisoning threshold value according to the operating condition of the engine 1 will be described. As described above, the exhaust emission discharged from the catalyst 7 may or may not be deteriorated, depending upon the operating condition of the engine 1 (the rate of generation of NOx by the engine), for the same degree of reduction of the NOx purifying ability of the NOx occlusion-reduction catalyst.

For example, the NOx purifying ability of the NOx occlusion-reduction catalyst 7 may be represented by a ratio (percent) of the amount of NOx that is reduced into $N_2$, with respect to the entire amount of NOx contained in the exhaust emission flowing into the catalyst 7. Alternatively, the NOx purifying ability may be represented simply by the NOx concentration (ppm) in the exhaust emission on the downstream side of the NOx occlusion-reduction catalyst 7.

Where the NOx purifying ability is represented by the ratio of the amount of the reduced NOx, the rate (mg/sec) at which the non-reduced NOx is passed downstream through the catalyst 7 increases with an increase in the rate (mg/sec) at which the NOx flows with the exhaust emission into the catalyst 7. Therefore, when the engine 1 is operated in an operating condition in which the rate of generation of the NOx is comparatively low, the amount of NOx discharged from the catalyst 7 is accordingly small. When the engine 1 is operated in an operating condition in which the rate of generation of the NOx is comparatively high, the amount of NOx discharged from the catalyst 7 may exceed an upper limit according to the regulation of total emission, even where the NOx purifying ability of the catalyst 7 remains unchanged.

Where the NOx purifying ability of the NOx occlusion-reduction catalyst 7 is represented simply by the NOx concentration (ppm) on the downstream side of the catalyst 7, the amount of NOx discharged from the catalyst 7 increases with an increase in the rate of flow of the exhaust emission through the catalyst 7, even where the NOx concentration on the downstream side of the catalyst 7 remains unchanged. Accordingly, the total amount of NOx discharged from the catalyst 7 is increased in the operating condition of the engine in which the rate of flow of the exhaust emission is comparatively high.

Therefore, the permissible lower limit of the NOx purifying ability of the catalyst 7 above which the actual amount of NOx discharged from the catalyst 7 is kept below a given lower limit must be determined according to the operating condition of the engine 1, such as the amount of generation of NOx and the rate of flow of the exhaust emission.

Figure 2:
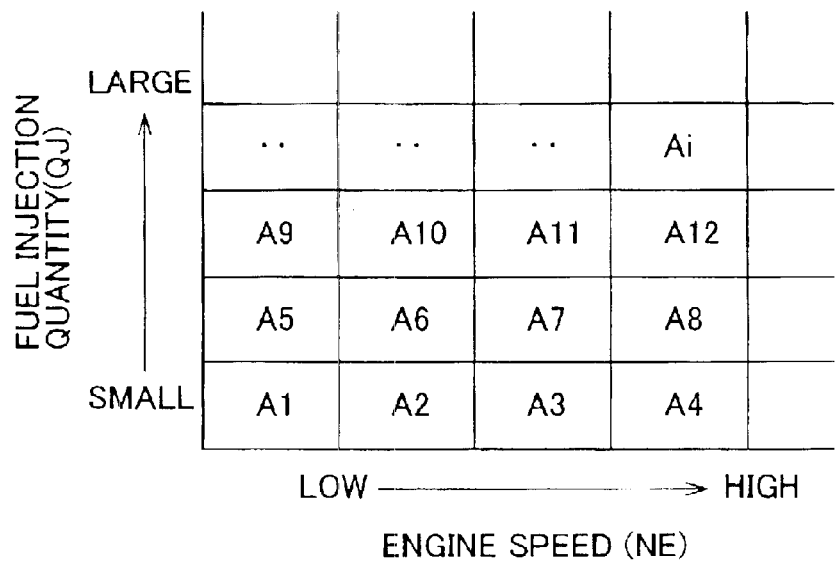
FIG. 2 is a view indicating a plurality of different operating states of the engine in the first embodiment of the invention.

In the present embodiment, the condition of the lean-burn operation of the engine 1 is divided into a plurality of different operating states Ai, and the permissible lower limit values of the NOx purifying ability of the NOx occlusion-reduction catalyst 7 are determined for the respective operating states Ai. FIG. 2 shows an example of the operating states Ai, wherein the condition of the lean-burn operation of the engine 1 is defined in a two-dimensional coordinate system in which a load acting on the engine 1 (fuel injection amount QJ) is taken along the ordinate while an operating speed NE of the engine 1 is taken along the abscissa. The lean-burn operating area of the engine 1 in this coordinate system is divided into the plurality of different operating states Ai defined by respective combinations of the engine load (QJ) and speed NE. The threshold values for determining whether the NOx purifying ability of the catalyst 7 has become lower than the lower limit are set for the respective operating states Ai. It is noted that the engine load relates to the amount of generation of NOx by the engine such that the amount of generation of NOx increases with an increase in the engine load, while the engine speed relates to the rate of flow of the exhaust emission such that the rate of flow of the exhaust emission increases with an increase in the engine speed. Accordingly, the threshold values corresponding to the different operating states Ai shown in FIG. 2 are determined such that the threshold value decreases with an increase in the engine load (amount of generation of NOx) and an increase in the engine speed NE (rate of flow of the exhaust emission). That is, the threshold values used to determine whether or not the SOx-poisoning removing treatment of the catalyst 7 should be initiated decrease in the positive directions of the ordinate and abscissa of the two-dimensional coordinate system of FIG. 2, so that the SOx-poisoning removing treatment is effected even when the amount of reduction of the NOx purifying ability is relatively small.

(2) Method of Determining the SOx Poisoning

In the present invention, a determination as to whether the NOx occlusion-reduction catalyst 7 suffers from SOx poisoning is made on the basis of the degree of reduction of the NOx purifying ability (NOx occluding ability) of the catalyst 7. There will next be described specific examples of the method of estimating the NOx purifying ability. In the example of FIG. 1, the NOx sensor 10 is disposed on a portion of the common exhaust passage 2 which is located downstream of the NOx occlusion-reduction catalyst 7. On the basis of the NOx concentration in the exhaust emission detected by the NOx sensor 10, the NOx purifying ability of the catalyst 7 is estimated. Two examples of the method of estimating the NOx purifying ability of the NOx occlusion-reduction catalyst 7 on the basis of the output of the NOx sensor 10 will be described.

(2-1) First Example of the Method of Estimating the NOx Purifying Ability

As described above, the rich-spike operation of the engine 1 is performed to reduce the NOx occluded in the NOx occlusion-reduction catalyst 7, each time the amount of the occluded NOx has increased to the predetermined upper limit. The amount of NOx occluded in the NOx occlusion-reduction catalyst 7 increases with an increase in the NOx concentration in the exhaust emission downstream of the catalyst 7 (hereinafter referred to as "downstream exhaust emission"), even before the catalyst 7 has been poisoned with SOx.

Figure 3:
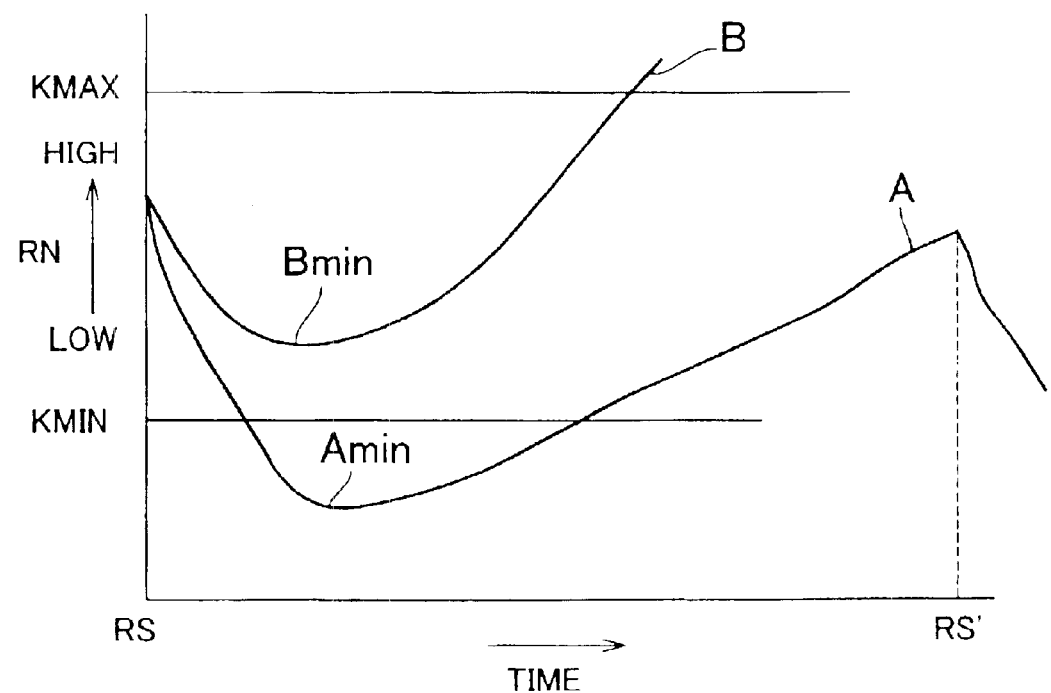
FIG. 3 is a view showing an example of a method of estimating an NOx purifying ability of an NOx occlusion-reduction catalyst in the first embodiment.

FIG. 3 shows a change with time of the NOx concentration RN in the downward exhaust emission, after one rich-spike operation of the engine 1. A curve A in FIG. 3 indicates a change in the NOx concentration where the NOx occlusion-reduction catalyst 7 is not suffering from the SOx poisoning, while a curve B indicates a change in the NOx concentration where the catalyst 7 is suffering from the SOx poisoning.

Where the NOx occlusion-reduction catalyst 7 is not suffering from the SOx poisoning, the maximum amount of NOx that can be occluded in the catalyst 7 is relatively large. The rich-spike operation of the engine 1 in this condition at a point of time RS indicated in FIG. 3 causes the reduction of the entire amount of NOx occluded in the catalyst 7, so that a most of the NOx amount contained in the exhaust emission generated in the subsequent lean-burn operation of the engine 1 can be occluded in the catalyst 7, whereby the NOx concentration in the downstream exhaust emission is considerably lowered to a minimum value Amin indicated in FIG. 3, as shown by the curve A. During the subsequent continuing lean-burn operation, the NOx occluding ability of the NOx occlusion-reduction catalyst 7 is gradually lowered with an increase in the amount of the occluded NOx, and the NOx concentration RN in the downstream exhaust emission slowly increases with time, so that the NOx concentration RN in the downstream exhaust emission is held at a comparatively low value upon the next rich-spike operation of the engine 1 (at a point of time RS' indicated in FIG. 3).

Where the NOx occlusion-reduction catalyst 7 is suffering from the SOx poisoning, the NOx concentration RN in the downstream exhaust emission is lowered after the rich-spike operation of the engine 1, as shown by the curve B. However, the amount of recovery of the NOx occluding ability of the catalyst 7 by the rich-spike operation is comparatively small due to the SOx poisoning, so that a minimum value Bmin of the NOx concentration RN (point Bmin indicated in FIG. 3) after the rich-spike operation in this case where the catalyst 7 is suffering from the SOx poisoning is considerably higher than that (Amin) in the case where the catalyst 7 is not suffering from the SOx poisoning. Further, the NOx occluding ability of the catalyst 7 is comparatively abruptly lowered during the lean-burn operation after the rich-spike operation, so that the NOx concentration RN increases at a high rate.

The present embodiment is arranged to detect, by the NOx sensor 10, the NOx concentration RN in the downstream exhaust emission during the lean-burn operation of the engine 1, and determine that the NOx purifying ability of the NOx occlusion-reduction catalyst 7 has been lowered below the lower limit, if the minimum value (Amin, Bmin) of the NOx concentration RN after the rich-spike operation has exceeded the threshold value KMIN determined by the detected operating state Ai (FIG. 2) of the engine 1, and if the presently detected NOx concentration RN is higher than the threshold value KMAX also determined by the detected operating state Ai (FIG. 2).

As described above, the threshold values KMAX and KMIN are determined so as to decrease with an increase in the engine load and an increase in the engine speed. Accordingly, the SOx-poisoning removing treatment is initiated to prevent an increase in the amount of NOx discharged from the NOx occlusion-reduction catalyst 7, when the NOx concentration RN in the downstream exhaust emission is relatively low, while the rate of generation of NOx by the engine and/or the rate of flow of the exhaust emission is/are relatively high. While the rate of generation of NOx and/or the rate of flow of the exhaust emission is/are relatively low, on the other hand, the SOx-poisoning removing treatment is not initiated until the NOx concentration RN has increased to a relatively high value, so that an increase in the amount of consumption of the fuel by the engine due to unnecessary SOx-poisoning removing treatment can be prevented.

The present embodiment is arranged to determine that the NOx purifying ability of the NOx occlusion-reduction catalyst 7 has been lowered below the lower limit, only if both of the minimum value of the NOx concentration RN after the rich-spike operation and the present value of the NOx concentration RN have exceeded the threshold values KMIN and KMAX, as described above. This arrangement is intended to minimize an influence of a variation of the output of the NOx sensor 10 (a variation in the zero point of the sensor).

Where the NOx sensor is disposed on the downstream side of the NOx occlusion-reduction catalyst, a determination that the NOx occluding ability of the NOx occlusion-reduction catalyst has been lowered below the lower limit due to the occlusion of NOx in the catalyst may be made when the NOx concentration detected by the NOx sensor has increased to a predetermined upper limit. In this case, the rich-spike operation of the engine may be initiated when this determination is made. Where the determination as to whether the NOx occluding ability of the NOx occlusion-reduction catalyst has been lowered below the lower limit due to the SOx poisoning is made on the basis of the output of the NOx sensor disposed on the downstream side of the catalyst, as in the present embodiment, the rich-spike operation is initiated before the NOx concentration in the downstream exhaust emission has reached the threshold KMAX, if the rich-spike operation is performed each time the output of the NOx sensor has reached a predetermined value. In this case, it is difficult to determine whether or not the catalyst is suffering from the SOx poisoning. In the present embodiment wherein the SOx poisoning is determined on the basis of the output of the NOx sensor, the timing at which the rich-spike operation is initiated is determined on the basis of an output of a so-called "NOx counter", not on the basis of the output of the NOx sensor.

Namely, the ECU 30 in the present embodiment is arranged to calculate the amount of generation of NOx per unit time (mg/sec) on the basis of the operating condition of the engine (e.g., engine load or fuel injection amount, and the engine speed) during its lean-burn operation, and according to a predetermined relationship (obtained by experimentation) between the operating condition and the amount of generation of NOx per unit time, and increment the NOx counter by an amount corresponding to a predetermined percentage of the calculated amount of generation of NOx per unit time. That is, it is considered that the predetermined percentage of the amount of NOx generated per unit time is actually occluded in the NOx occlusion-reduction catalyst, so that the present count of the NOx counter represents the cumulative amount of NOx occluded in the catalyst. The ECU 30 is arranged to initiate the rich-spike operation of the engine 1 when the count of the NOx counter has increased to a predetermined value (e.g., 60 percent of the maximum amount of NOx that can be occluded in the NOx occlusion-reduction catalyst in the normal state), to reduce the occluded NOx. Thus, the timing of initiation of the rich-spike operation can be determined, without using the output of the NOx sensor.

(2-2) Second Example of the Method of Estimating the NOx Purifying Ability

The second example of the method of estimating the NOx purifying ability of the NOx occlusion-reduction catalyst on the basis of the output of the NOx sensor will be described.

In the first example described above, the NOx purifying ability of the NOx occlusion-reduction catalyst 7 is estimated on the basis of the NOx concentration in the exhaust emission on the downstream side of the catalyst 7, which is detected by the NOx sensor 10, but the estimation of the amount of NOx occluded in the NOx occlusion-reduction catalyst 7 and the determination of the timing at which the rich-spike operation of the engine 1 is initiated are made by using the NOx counter.

The present second example is different from the first example in that the estimation of the amount of NOx occluded in the NOx occlusion-reduction catalyst 7 and the determination of the timing of initiation of the rich-spike operation are made on the basis of the output of the NOx sensor 10, and in that the NOx purifying ability of the catalyst 7 is estimated on the basis of a time interval between the adjacent rich-spike operations.

As described above, the NOx contained in the exhaust emission during the lean-burn operation of the engine 1 is occluded in the NOx occlusion-reduction catalyst 7, so that the NOx purifying ability of the catalyst 7 in the normal state is lowered with an increase in the amount of NOx occluded in the catalyst 7. In the present example, the rich-spike operation is initiated to reduce the NOx occluded in the NOx occlusion-reduction catalyst 7, when the NOx concentration RN in the downstream exhaust emission detected by the NOx sensor 10 has increased to a predetermined threshold value RSN.

Before any lowering of the NOx occluding ability of NOx occlusion-reduction catalyst 7 has occurred due to the SOx poisoning, the original NOx occluding ability can be fully recovered by performing the rich-spike operation of the engine 1. After the NOx occluding ability of the catalyst 7 has been lowered due to the SOx poisoning, the original NOx ability cannot be fully recovered by the rich-spike operation.

Figure 4:
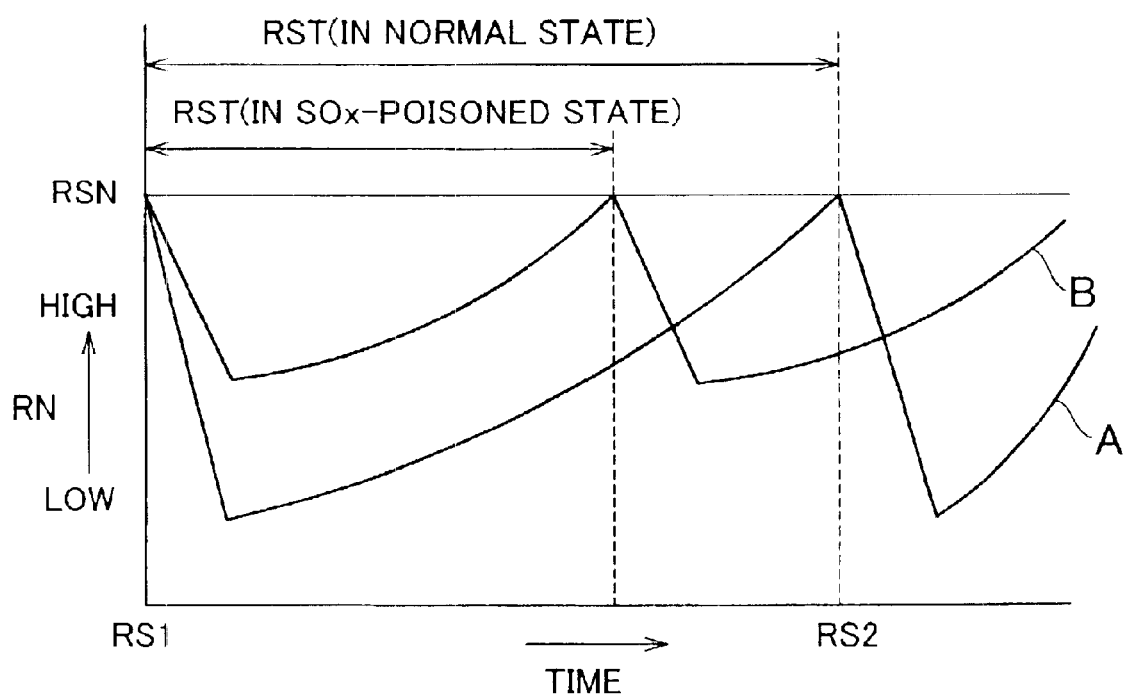
FIG. 4 is a view showing a second embodiment of the method of estimating the NOx purifying ability of the NOx occlusion-reduction catalyst.

FIG. 4 shows a change with time of the NOx concentration RN in the downstream exhaust emission after each rich-spike operation. A curve A indicates a change of the NOx concentration RN where the NOx occlusion-reduction catalyst 7 is in the normal state, while a curve B indicates a change of the NOx concentration RN where the catalyst 7 is suffering from the SOx poisoning.

As shown in FIG. 4, the NOx concentration RN in the exhaust emission on the downstream side of the NOx occlusion-reduction catalyst 7 decreases immediately after the rich-spike operation of the engine 1 at a point of time RS1, and subsequently increases during the continuing lean-burn operation of the engine 1. When the NOx concentration RN has increased to a threshold value RSN, at a point of time RS2, the next rich-spike operation is initiated. Where the NOx occlusion-reduction catalyst 7 is in the normal state (not suffering from the SOx poisoning), a time interval RST between adjacent rich-spike operations is comparatively long. After the NOx occluding ability of the catalyst 7 has been lowered due to the SOx poisoning, the amount of NOx that can be occluded in the catalyst 7 is reduced, so that the next rich-spike operation following the rich-spike operation at the point of time RS1 is initiated at a point of time prior to the point of time RS2. Namely, the time interval RST between the adjacent rich-spike operations is shortened as the catalyst 7 is poisoned with SOx.

In the present example, the rich-spike operation is effected each time the NOx concentration detected by the NOx sensor 10 disposed downstream of the catalyst 7 has increased to the predetermined threshold value RSN. Further, when the measured time interval RST (FIG. 4) between the adjacent rich-spike operations is shorter than a predetermined threshold value RST0, it is determined that the NOx purifying ability of the NOx occlusion-reduction catalyst 7 has been lowered to the lower limit due to the SOx poisoning. Upon this determination, the SOx-poisoning removing treatment of the catalyst 7 is initiated.

The threshold value RST0i used to determine that the SOx-poisoning removing treatment should be initiated is set (usually to a different value) for each of the different operating states Ai shown in FIG. 2, such that the threshold value RSTOi increases with an increase in the engine load and an increase in the engine speed. Accordingly, the SOx-poisoning removing treatment is effected to prevent an increase in the amount of NOx discharged from the catalyst 7, even when the time interval RST between the adjacent rich-spike operations is comparatively short, while the rate of generation of NOx by the engine and/or the rate of flow of the exhaust emission is/are comparatively high. While the rate of generation of NOx and/or the rate of flow of the exhaust emission is/are comparatively low, on the other hand, the SOx-poisoning removing treatment is not effected until the time interval RST has been shortened to a comparatively short time (because the value of RSTOi is lower for such engine operating conditions). This arrangement prevents an increase in the amount of consumption of fuel by the engine 1 due to unnecessary SOx-poisoning removing treatment.

In the actual operation of the engine 1 in a transient state, for example, the time interval RST between the adjacent rich-spike operations may be temporarily shortened even when the NOx occlusion-reduction catalyst 7 is in the normal state. In view of this, the present embodiment is arranged to effect the SOx-poisoning removing treatment when the number of the successive rich-spike time intervals RST shorter than the threshold value RST0i during the lean-burn operation of the engine 1 has increased to a predetermined value. This arrangement prevents the unnecessary SOx-poisoning removing treatment due to erroneous determination of the necessity of the treatment on the basis of the temporary shortening of the time interval RST.

(3) SOx-poisoning Removing Treatment

The SOx-poisoning removing treatment of the NOx occlusion-reduction catalyst 7 will be described. In the present embodiment, the SOx-poisoning removing treatment is initiated when the SOx poisoning of the NOx occlusion-reduction catalyst 7 is detected by either one of the two methods described above. The SOx-poisoning removing treatment is a treatment to release the SOx occluded in the NOx occlusion-reduction catalyst, for thereby recovering the original NOx purifying ability (NOx occluding and reducing ability) of the catalyst.

As described above, this SOx-poisoning treatment is effected by lowering the air/fuel ratio of the exhaust emission flowing into the NOx occlusion-reduction catalyst 7, to the stoichiometric value or lower, while at the same time raising the temperature of the catalyst 7 to a level (e.g., about 920° K or about 650° C.) at which the SOx is released.

It is noted that the temperature of the catalyst 7 during the operation of the engine 1 is almost equal to that of the exhaust emission, and therefore varies depending upon the operating condition of the engine 1. When the engine 1 is operated at a relatively high speed under a relatively high load, for example, the temperature of the exhaust emission is relatively high, and the temperature of the NOx occlusion-reduction catalyst 7 is raised to the above-indicated level at which the SOx is released. In this condition, the air/fuel ratio of the air-fuel mixture to be supplied to the engine 1 is controlled to the stoichiometric value, and the ignition timing of the engine 1 is slightly retarded, if necessary. In this case, the SOx-poisoning removing treatment can be achieved with substantially no influences on the operating condition and the fuel economy of the engine 1.

When the engine 1 is operated at a relatively low speed under a relatively low load, on the other hand, the temperature of the exhaust emission from the engine 1 is considerably low, so that the temperature of the NOx occlusion-reduction catalyst 7 is accordingly low. In this case, the temperature of the catalyst 7 cannot be raised to the level at which the SOx is released, by merely controlling the air/fuel ratio of the engine 1 to the stoichiometric value, and optionally retarding the ignition timing of the engine. It is required to effect a so-called "cylinder-bank control" or a so-called "post-fuel-injection control". In the cylinder-bank control, at least one of the cylinders of the engine 1 is operated in a rich-burn state at a fuel-rich air/fuel ratio, while the other cylinder or cylinders is/are operated in a lean-burn state at a fuel-lean air/fuel ratio, so that unburned hydrocarbon contained in the exhaust emission generated by the rich-burn cylinder or cylinders is burned on the catalyst 7, with oxygen contained in the exhaust emission generated by the lean-burn cylinder or cylinders. In the post-fuel-injection control, an additional amount of fuel is injected in each cylinder during its expansion or exhaust stroke, so that an unburned fuel supplied to the catalyst 7 is burned. In this case, the operating condition of the engine 1 and the required amount of fuel consumption by the engine 1 are influenced to a comparatively large extent by the SOx-poisoning removing treatment.

That is, if the SOx-poisoning removing treatment is effected always in the same manner irrespective of the operating condition of the engine 1, the SOx poisoning of the catalyst 7 cannot be sufficiently removed, or the operating condition of the engine 1 is considerably influenced by the SOx-poisoning removing treatment. In view of this, the present embodiment is arranged to change the manner of the SOx-poisoning removing treatment, depending upon the specific operating state Ai of the engine 1 described above by reference to FIG. 2.

There will be described various aspects of the SOx-poisoning removing operation depending upon the operating state Ai of the engine 1.

(3-1) Stoichiometric Operation (Stoichiometric Operation+ Ignition Timing Retardation)

In the present embodiment, the air/fuel ratio of the engine 1 is changed from a fuel-lean value to the stoichiometric value, and optionally the ignition timing of the engine 1 is slight retarded, when the lean-burn operation of the engine 1 is performed under the highest load or at the highest speed. In the operating states Ai in which the engine load and/or the engine speed is/are relatively high, the temperature of the exhaust emission is considerably high even in the lean-burn operation of the engine 1, so that the operation of the engine 1 at the stoichiometric air/fuel ratio in addition to the optional ignition timing retardation permits the temperature of the exhaust emission to be easily raised to a level at which the temperature of the catalyst 7 is high enough to permit the releasing of the SOx.

(3-2) Switching of the Exhaust Passage

When the engine 1 is operated in the operating states Ai in which the load and speed are lower than those described above at (3-1), the temperature of the catalyst 7 cannot be raised to a sufficiently high level, by merely operating the engine at the stoichiometric air/fuel ratio. In this case, the switch valve 9c disposed on the inlet portion 9a of the common exhaust passage 2, which is located upstream of the catalyst 7, is switched to the second position at which the exhaust emission flows from the common exhaust passage 2 directly into the catalyst 7, so that the exhaust emission having a high temperature raises the temperature of the catalyst 7.

Figure 5A:
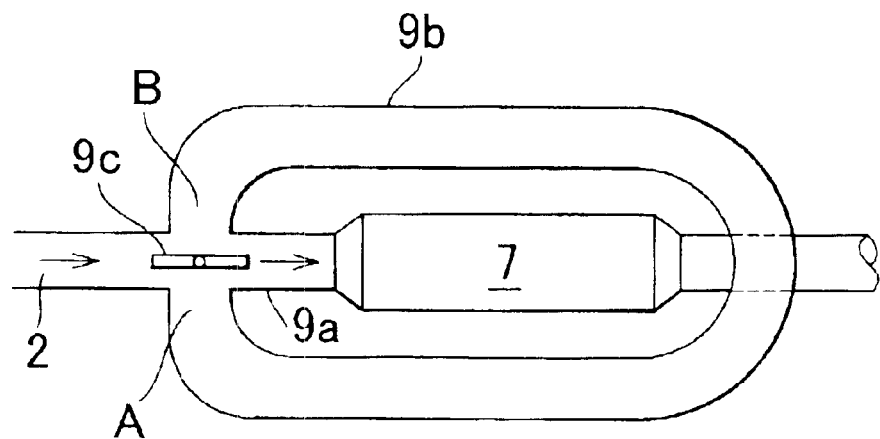
FIGS. 5A and 5B are views for explaining a temperature control of the NOx occlusion-reduction catalyst by controlling an exhaust-passage switch valve, in the first embodiment.
Figure 5B:
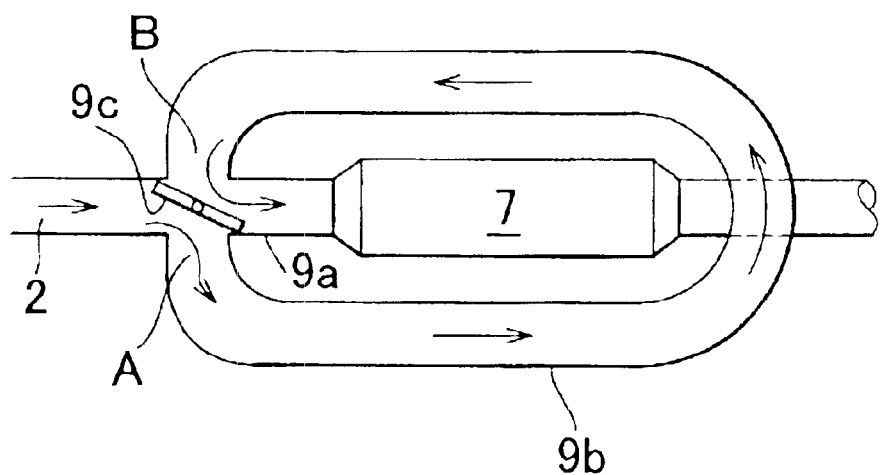

FIGS. 5A and 5B show different flows of the exhaust emission depending upon the presently established position of the switch valve 9c. The switch valve 9c is placed in the first position of FIG. 5A when the temperature of the exhaust emission is still low, for example, immediately after the starting of the engine 1. In this first position, the exhaust emission flows from the common exhaust passage 2 directly into the catalyst 7, without flowing through the U-shaped exhaust pipe 9b, so that the amount of drop of the temperature of the exhaust emission flowing through the catalyst 7 is comparatively small, and the catalyst 7 can be heated in a short time after the starting of the engine 1.

When the temperature of the exhaust emission has been raised to a sufficiently high level as a result of the warm-up operation of the engine 1, the switch valve 9c is switched to the second position of FIG. 5B, so that the exhaust emission is guided by the switch valve 9c, so as to be admitted into the U-shaped exhaust pipe 9b via one end A of the exhaust pipe 9b. The exhaust emission then flows through the U-shaped exhaust pipe 9b, and is admitted into the catalyst 7 via the other end B of the exhaust pipe 9b. As a result, the exhaust emission is cooled by heat dissipation from the wall of the U-shaped exhaust pipe 9b, so that the exhaust emission flows into the catalyst 7, with a comparatively large amount of drop of its temperature, whereby the catalyst 7 is protected against overheating.

Thus, in the present embodiment, the switch valve 9c is switched to the first position of FIG. 5A, in the operating states Ai of the engine 1 in which the operation of the engine 1 at the stoichiometric air/fuel ratio is not sufficient to raise the temperature of the exhaust emission to the desired level. As a result, the temperature of the exhaust emission flowing into the NOx occlusion-reduction catalyst 7 is raised, so that it is possible to heat the catalyst 7 to the level of releasing of the SOx, in the above-indicated operating states of the engine 1.

(3-3) Cylinder-bank Control

In the operating states Ai in which the engine load and speed are lower than in the operating states Ai in which the SOx-poisoning removing treatment is effected by switching the switch valve 9c to the first position of FIG. 5A, as described above, the temperature of the catalyst 7 is raised by the cylinder-bank control in which at least one of the cylinders is operated in a rich-burn state at a fuel-rich air/fuel ratio, while the other cylinder or cylinders is/are operated in a lean-burn state at a fuel-lean air/fuel ratio.

In the present embodiment, the first and fourth cylinders #1 and #4 constitute one group of cylinders, while the second and third cylinders #2 and #3 constitute another group of cylinders, and these two groups of cylinders are connected to the mutually independent first and second exhaust manifolds 21a, 21b, respectively. When the cylinder-bank control is effected for the SOx-poisoning removing treatment, one of the first and second groups of cylinders is operated in the rich-burn sate, while the other group of cylinders is operated in the lean-burn state. As a result, a fuel-rich exhaust emission discharged from the group of cylinders operated in the rich-burn state contains a relatively large amount of an unburned hydrocarbon component, while a fuel-lean exhaust emission discharged from the other group of cylinders operated in the lean-burn state contains a relatively large amount of oxygen. These exhaust emissions are mixed with each other in the common exhaust passage 2, and a mixture of these exhaust emissions is an exhaust emission which has an air/fuel ratio near the stoichiometric value, containing both the unburned hydrocarbon component and the oxygen in relatively large amounts. This mixture flows into the NOx occlusion-reduction catalyst 7, so that a relatively large amount of the unburned hydrocarbon component reacts with the oxygen (and is burned), whereby the temperature of the NOx occlusion-reduction catalyst 7 is raised by the reaction heat.

In the present embodiment, the temperature of the catalyst 7 is raised to the level of releasing of the SOx, by the cylinder-bank control, when the temperature of the exhaust emission is comparatively low while the engine 1 is operated under a comparatively low speed under a comparatively low load.

(3-4) Post-fuel-injection Control

The temperature of the catalyst may not be raised to the desired level, even by the cylinder-bank control, in the operating states Ai of the engine 1 in which the load and speed are much lower than described above. The present embodiment is arranged to effect the post-fuel-injection for raising the temperature of the catalyst 7, when the engine load and speed are extremely low.

The post-fuel-injection control is an operation to inject a fuel into each cylinder during its expansion or exhaust stroke, in addition to a normal operation to inject the fuel during the lean-burn operation of the engine. In the expansion or exhaust stroke, the temperature within the cylinder is comparatively low, so that the fuel injected in the cylinder during the expansion or exhaust stroke is not burned but is merely vaporized into an unburned hydrocarbon component by the heat of the exhaust emission. During the post-fuel-injection control, therefore, each cylinder discharges an exhaust emission having a fuel-lean air/fuel ratio and containing a large amount of unburned hydrocarbon as well as a large amount of oxygen. As a result, the unburned hydrocarbon in the exhaust emission is oxidized (burned) on the NOx occlusion-reduction catalyst 7, generating a large amount of heat. Since the fuel injected into each cylinder in the post-fuel-injection control is not burned within the cylinder, the fuel if injected into the cylinder by a relatively large amount in the post-fuel-injection would not cause a variation in the engine torque or a misfiring problem of the engine. Therefore, the post-fuel-injection control permits the catalyst 7 to be supplied with a larger amount of unburned hydrocarbon than the cylinder-bank control, making it possible to raise the temperature of the catalyst 7 to the SOx releasing level, even if the initial temperature of the catalyst is extremely low.

When it is determined that the NOx purifying ability of the NOx occlusion-reduction catalyst 7 has been lowered to the lower limit due to the SOx poisoning while the engine 1 is operated in a certain operating state Ai, the SOx-poisoning removing treatment may be initiated even while the temperature of the catalyst 7 is still low. However, the initiation of the SOx-poisoning removing treatment while the temperature of the catalyst 7 is still low has a large influence on the fuel economy of the engine 1. In this respect, it is desirable to initiate the SOx-poisoning removing treatment only after the temperature of the exhaust emission has been raised to the desired level as a result of a change in the operating state. Where the catalyst 7 suffers from the SOx poisoning in a given operating state Ai of the engine 1, the catalyst 7 may have a sufficient NOx purifying ability in another operating state Ai of the engine 1.

In view of the above, it is possible to avoid initiating the SOx-poisoning removing treatment immediately after the determination that the NOx purifying ability of the NOx occlusion-reduction catalyst 7 has been lowered to the lower limit due to the SOx poisoning in a certain operating state Ai of the engine 1, but to initiate the SOx-poisoning removing treatment after the temperature of the exhaust emission has been raised to the desired level as a result of a change in the operating state of the engine 1. In this case wherein the NOx purifying ability has been lowered due to the SOx poisoning in the present operating state Ai of the engine 1, the continuing lean-burn operation of the engine 1 may cause unpurified NOx to be discharged downstream of the NOx occlusion-reduction catalyst 7. Therefore, the present embodiment is arranged to change the air/fuel ratio to the stoichiometric value, immediately after the detection of the lowering of the NOx purifying ability due to the SOx poisoning in the certain operating state of the engine 1, so that the temperature of the exhaust emission is raised to the desired level.

The amount of NOx contained in the exhaust emission is reduced by operating the engine 1 at the stoichiometric air/fuel ratio. As described above, the NOx occlusion-reduction catalyst 7 functions as a three-way catalyst capable of simultaneous oxidization and reduction at an air/fuel ratio equal or close to the stoichiometric value. The NOx occlusion-reduction catalyst 7 whose NOx purifying ability has been lowered may normally function as the three-way catalyst. Accordingly, by operating the engine 1 at the stoichiometric air/fuel ratio in the operating state in which the NOx purifying ability of the catalyst has been lowered, the catalyst is capable of simultaneously purifying the three components, HC, CO and NOx, preventing NOx from being discharged into the atmosphere due to the lowering of the NOx purifying ability.

Further, an increase in the amount of consumption of the fuel required by the engine to effect the SOx-poisoning removing treatment can be minimized by operating the engine 1 at the stoichiometric air/fuel ratio only in the operating state Ai in which the NOx purifying ability of the catalyst 7 has been lowered due to the SOx poisoning, and initiating the SOx-poisoning removing treatment only after the temperature of the exhaust emission has been raised to the desired level.

The determination of the SOx poisoning of the catalyst 7 and the SOx-poisoning removing treatment, which have been discussed, will be described more specifically.

Figure 6:
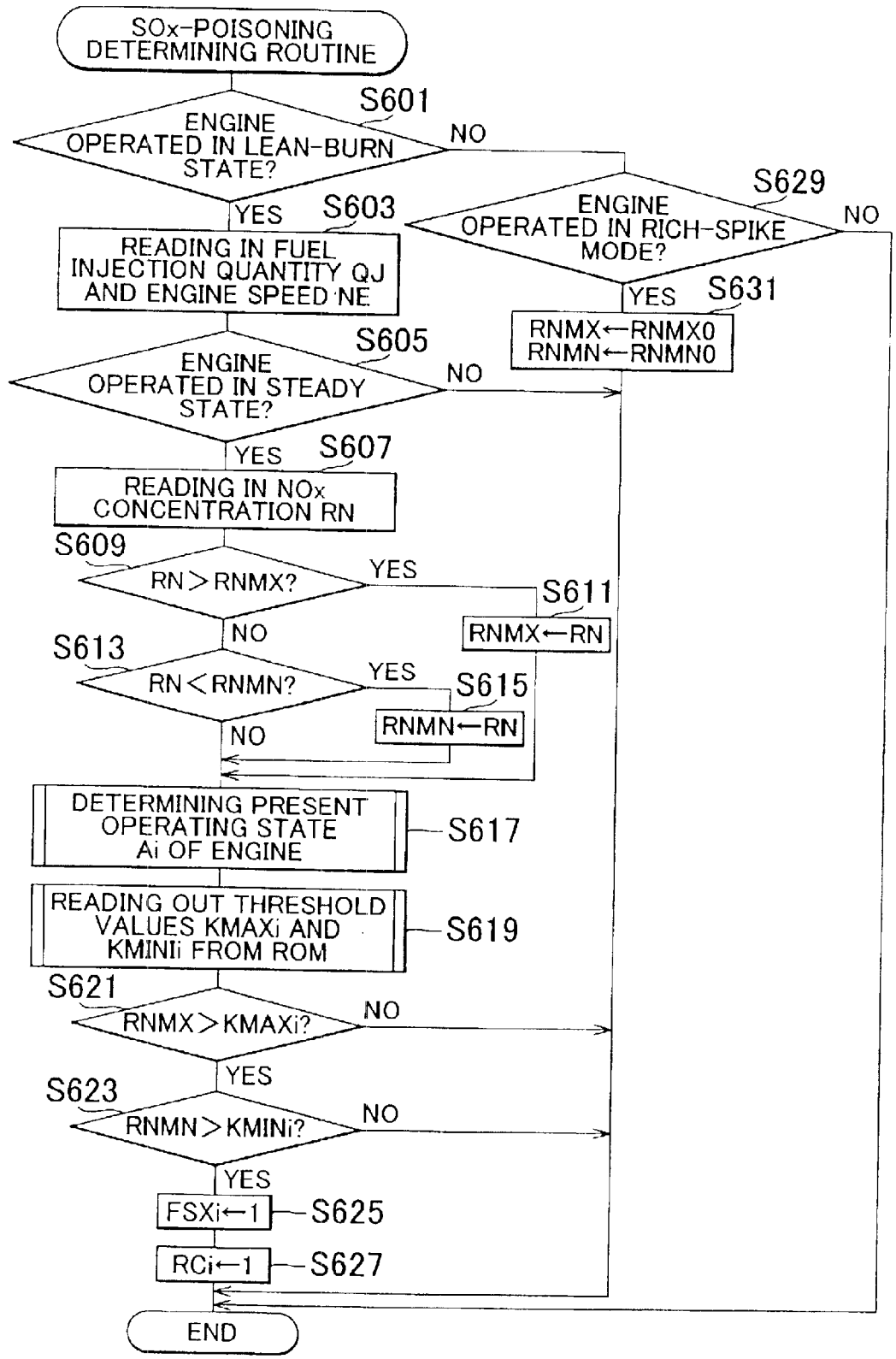
FIG. 6 is a flow chart illustrating a routine executed in the first embodiment to determine SOx poisoning of the NOx occlusion-reduction catalyst.

Referring to the flow chart of FIG. 6, there is illustrated an SOx-poisoning determining routine for determining whether the NOx occlusion-reduction catalyst 7 is suffering from SOx poisoning. This routine of FIG. 6 is executed by the ECU 30 with a predetermined cycle time, to determine whether the catalyst 7 has been poisoned with SOx, depending upon the amount of reduction of the NOx purifying ability of the catalyst 7 estimated on the basis of the output of the NOx sensor 10 as described above by reference to FIG. 3.

The SOx-poisoning determining routine of FIG. 6 is initiated with step 601 to determine whether the engine 1 is operated in a lean-burn state. If the engine 1 is not operated in a lean-burn state, the NOx purifying ability (NOx occluding ability) of the catalyst 7 cannot be estimated according to the method of FIG. 3. In this case, the control flow goes to step 629 to determine whether the engine 1 not operated in a lean-burn state is in a rich-spike mode. If the engine 1 is not in a rich-spike operation, one cycle of execution of the SOx-poisoning determining routine is terminated, since the engine 1 is operating in a steady state at the stoichiometric air/fuel ratio or a fuel-rich air/fuel ratio.

If an affirmative decision that the engine 1 is in a rich-spike mode is obtained in the step 629, the control flow goes to step 631 to reset stored maximum and minimum values RNMX and RNMN of the output of the NOx sensor 10, to respective initial values RNMX0 and RNMN0, for preparation for the next cycle of execution of the SOx-poisoning determining routine after the rich-spike operation.

If an affirmative decision that the engine 1 is operated in a lean-burn state is obtained in step 601, the control flow goes to step 603 to read in the present load (fuel injection amount QJ) and speed NE of the engine 1, and then to step 605 to determine whether the engine 1 is operated in a steady state. In this step 605, it is determined that the engine 1 is operated in a steady state if the amounts of change of the fuel injection amount QJ and speed NE read in the present cycle from those read in the last cycle are not larger than predetermined thresholds. If the engine 1 is not operated in a steady state, one cycle of execution of the present SOx-poisoning determining routine is terminated.

If the engine 1 is operated in a steady state, the control flow goes to step 607 to read in the output of the NOx sensor 10 indicative of the NOx concentration RN in the exhaust emission on the downstream side of the NOx occlusion-reduction catalyst 7. The step 607 is followed by steps 609, 611, 613 and 615 provided to update the stored maximum and minimum values RNMX and RNMN of the NOx concentration RN.

Then, the control flow goes to step 617 to determine the present operating state Ai of the engine 1. That is, the step 617 is formulated to determine one of the different operating states Ai of the engine 1 (shown in FIG. 2), on the basis of the engine load (fuel injection amount Qj) and speed NE which were read in the step 603. The step 617 is followed by step S619 to read out the threshold values KMAXi and KMINi corresponding to the operating state Ai determined in the step 617, from a data map or table stored in the ROM of the ECU 30.

The step 619 is followed by steps 621 and 623 to determine whether the maximum and minimum values RNMX and RNMN updated in the respective steps 611 and 615 have exceeded the respective threshold values KMAXi and KMINi corresponding to the present operating state Ai of the engine 1. As described above by reference to FIG. 3, the maximum value RNMX higher than the threshold value KMAXi and the minimum value RNMN higher than the threshold value KMINi indicate that the NOx purifying ability of the NOx occlusion-reduction catalyst 7 has been lowered to the lower limit, in the present operating state Ai. In this case, therefore, it is determined that the catalyst 7 is suffering from SOx poisoning. Accordingly, if an affirmative decision is obtained in both of the steps 621 and 623, the control flow goes to step 625 in which an SOx-POISONING flag FSXi is set to "1" indicating that the engine 1 is suffering from the SOx poisoning in the present operating state Ai. The SOx-POISONING flag FSXi is provided for each of the different operating states Ai.

Step S625 is followed by step S627 to set a STOICHIOMETRIC AIR/FUEL RATIO flag RCi corresponding to the present operating state Ai to "1". When the STOICHIOMETRIC AIR/FUEL RATIO flag RCi is set at "1", the engine 1 is operated at the stoichiometric air/fuel ratio in the operating state Ai until the SOx poisoning is removed, according to another control routine executed by the ECU 30.

In the present embodiment, the operation of the engine 1 at the stoichiometric air/fuel ratio is performed only in the operating state Ai in which the SOx poisoning has been detected. However, the engine 1 may be operated at the stoichiometric air/fuel ratio, not only in the first operating state Ai in question, but also in the second operating state Ai in which the engine speed (the rate of flow of the exhaust emission) is next lower than that in the first operating state. In this respect, it is noted that the SOx poisoning of the catalyst 7 is expected to be detected also in this second operating state Ai in which the rate of flow of the exhaust emission is next lower than that in the first operating state Ai.

Figure 7:
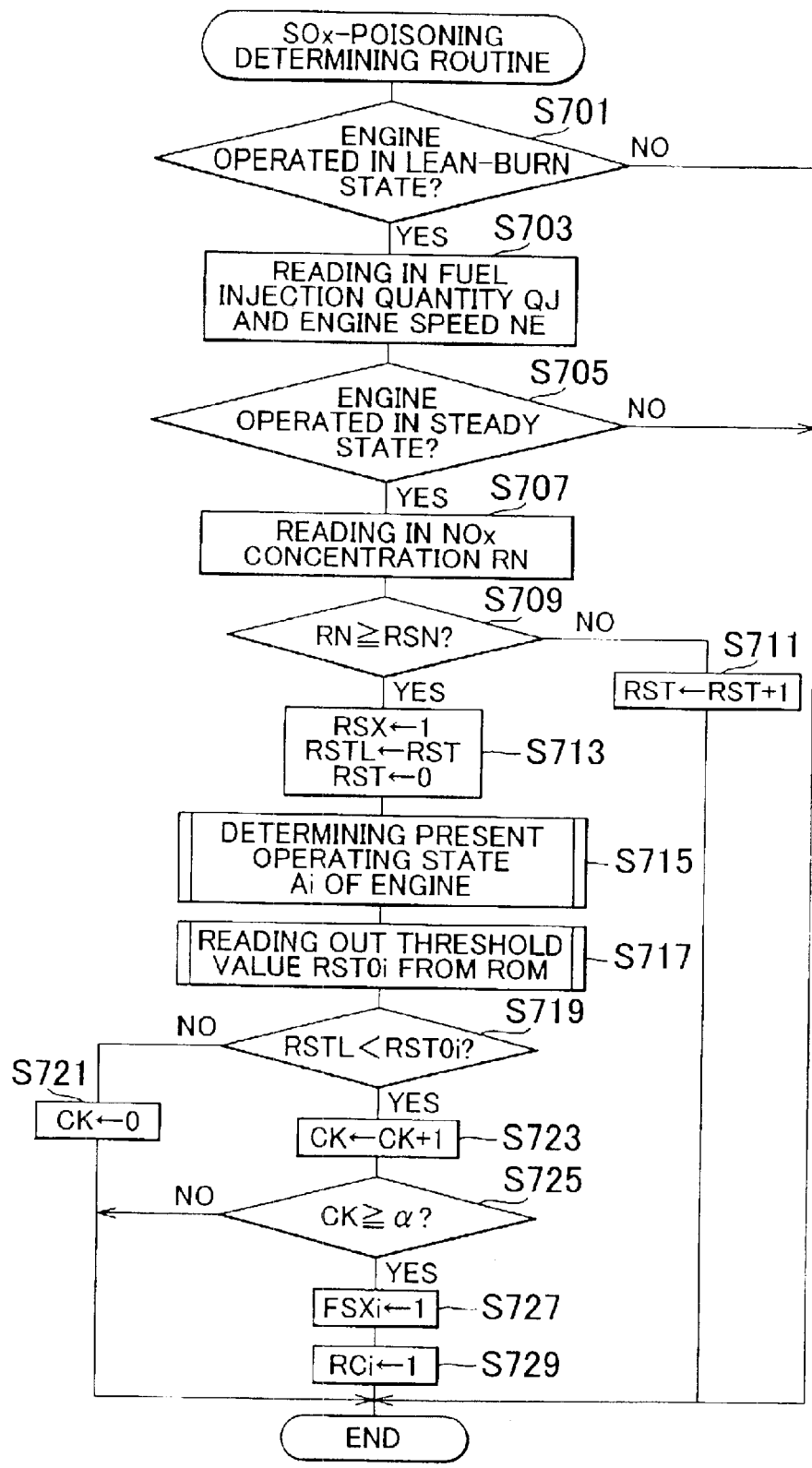
FIG. 7 is a flow chart illustrating a routine executed in the second embodiment of this invention, to determine the SOx poisoning of the NOx occlusion-reduction catalyst.

Referring next to the flow chart of FIG. 7, there is illustrated an SOx-poisoning determining routine according to a second embodiment of this invention. This routine of FIG. 7 is also executed by the ECU 30 with a predetermined cycle time, to determine whether the catalyst 7 has been poisoned with SOx, on the basis of the time interval RST between the adjacent rich-spike operations, as described above by reference to FIG. 4.

The routine of FIG. 7 is initiated with step 701 identical with the step 601 of FIG. 6, to determine whether the engine 1 is operated in a lean-burn state. If the engine 1 is not operated in a lean-burn state, one cycle of execution of the SOx-poisoning determining routine is terminated.

If an affirmative decision that the engine 1 is in a lean-burn operation is obtained in the step 701, the control flow goes to step 703 to read in the present load (fuel injection amount QJ) and speed NE of the engine 1, and then to step 705 to determine whether the engine 1 is operated in a steady state. These steps 703 and 705 are identical with the steps 603 and 605 of FIG. 6.

If an affirmative decision that the engine 1 is operated in a steady state is obtained in the step 705, the control flow goes to step 707 to read in the output of the NOx sensor 10 indicative of the NOx concentration RN in the exhaust emission on the downstream side of the NOx occlusion-reduction catalyst 7. The step 707 is followed by step 709 to determine, on the basis of the read NOx concentration RN, whether a rich-spike operation of the engine 1 should be performed. Namely, the NOx concentration RN is compared with a threshold value RSN for determining whether the rich-spike operation should be performed.

If a negative decision that the NOx concentration RN has not increased to the threshold value RSN is obtained in the step 709, that is, if RN<RSN, this means that the amount of NOx occluded in the NOx occlusion-reduction catalyst 7 is still small and that it is not necessary to perform a rich-spike operation of the engine 1. In this case, therefore, the control flow goes to step 711 to increment a RICH-SPIKE INTERVAL counter RST, and one cycle of execution of the present routine is terminated.

If it is determined in the step 709 that RN≧RSN, a rich-spike operation of the engine 1 should be performed. In this case, the control flow goes to step 713 in which a RICH-SPIKE flag RSX is set to "1", store the present count of the RICH-SPIKE INTERVAL counter RST as a time interval RSTL in the RAM of the ECU 30, and reset the counter RST to zero. It will be understood that the count of the counter RST incremented in the step 711 corresponds to a time which has passed after the last rich-spike operation was performed, and that the time interval RSTL stored in the RAM in the step 713 is a time interval between the moments of the last and present rich-spike operations, which is referred to as "a rich-spike time interval".

The above-indicated steps 709, 711 and 713 provided to measure the rich-spike time interval are followed by step 715 to determine the present operating state Ai of the engine 1 on the basis of the engine load QJ and speed NE, and according to the relationship of FIG. 2. Then, step 717 is implemented to read out the threshold value RST0i corresponding to the present operating state Ai, from a data map or table stored in the ROM of the ECU 30. In this second embodiment, too, the threshold value RST0i is set for each of the different operating states Ai.

The step S717 is followed by steps 719, 721, 723 and 725, which are provided to determine, on the basis of the rich-spike time interval, whether the catalyst 7 is suffering from SOx poisoning. Namely, the step 719 is implemented to determine whether the actual rich-spike time interval RSTL has become shorter than the threshold value RSTOi corresponding to the present operating state Ai of the engine 1. If the rich-spike time interval RSTL has become shorter than the threshold value RSTOi, this indicates a possibility that the catalyst 7 is suffering from the SOx poisoning. In this case, therefore, the control flow goes to step 723 to increment a SOx-POISONING counter CK. If a negative decision that the rich-spike time interval RSTL is not shorter than the threshold value RSTOi corresponding to the present operating state Ai is obtained in the step 719, the control flow goes to step 721 to reset the SOx-POISONING counter CK, and one cycle of execution of the present routine is terminated.

The step 723 is followed by step 725 to determine whether a count of the SOx-POISONING counter CK incremented in the step 723 has reached a predetermined threshold value $\alpha$. If the count of the counter CK has not reached the threshold value $\alpha$, one cycle of execution of the routine is terminated, without the following steps 727, 729 being implemented.

If an affirmative decision that the count of the counter CK has reached the threshold value $\alpha$ is obtained in the step 725, the step 727 is then implemented to set the SOx-POISONING flag FSXi corresponding to the present operating state Ai to "1" indicating the SOx poisoning, and the step 729 is implemented to set the STOICHIOMETRIC AIR/FUEL RATIO flag RCi corresponding to the present operating state Ai, to "1". The functions of the SOx-POISONING flag FSXi and the STOICHIOMETRIC AIR/FUEL RATIO flag RCi have been described with respect to the routine of FIG. 6.

Thus, the present embodiment is arranged to determine that the NOx occlusion-reduction catalyst 7 is suffering from the SOx poisoning, only when the number of the consecutive affirmative decisions in the step 719 that the rich-spike time interval RSTL has become shorter than the threshold value RST0i has increased to the predetermined value $\alpha$.

Referring to the flow chart of FIG. 8, there will be described an SOx-poisoning removing routine which is executed when the SOx poisoning of the catalyst 7 is detected.

Figure 8:
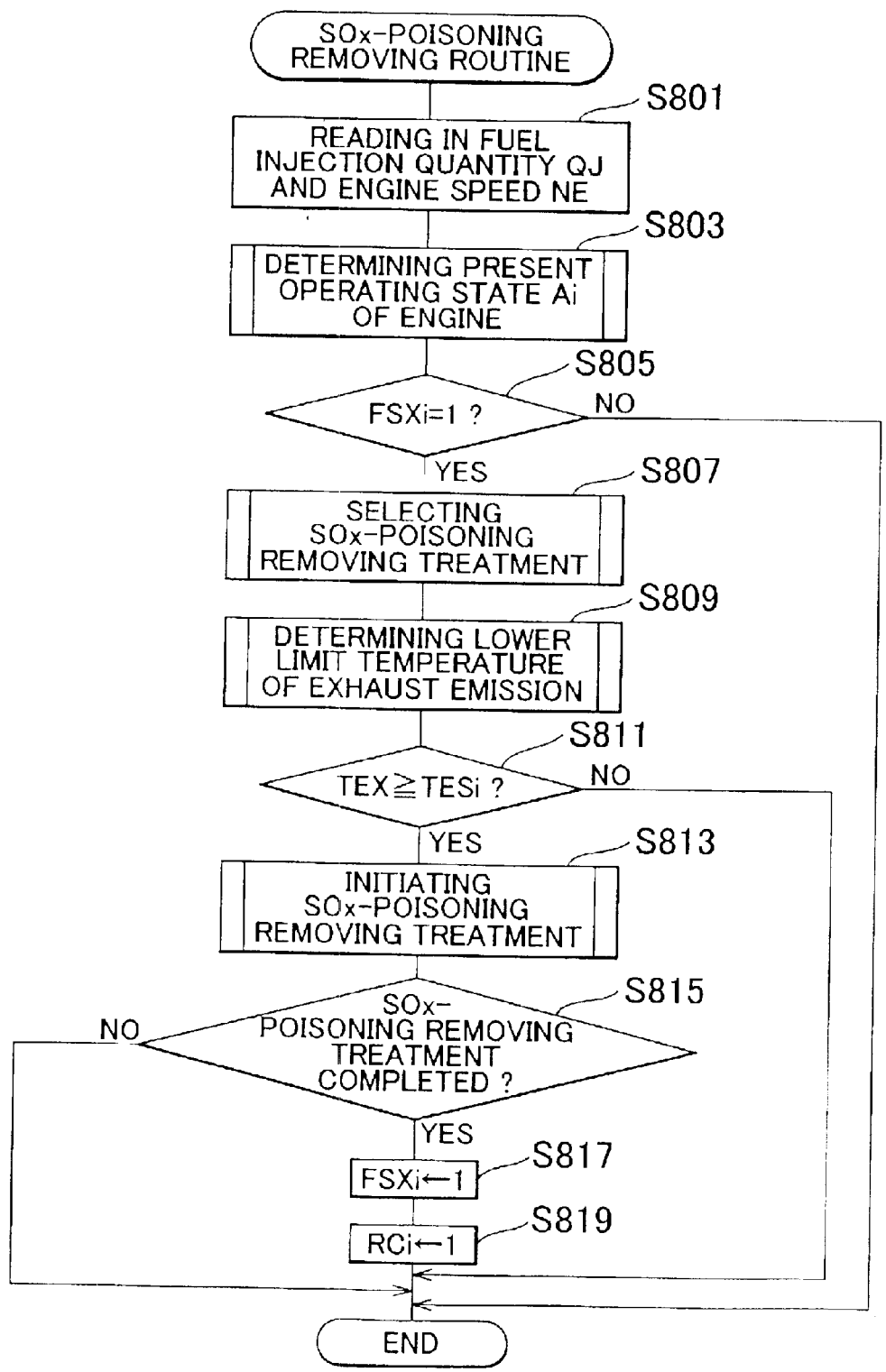
FIG. 8 is a flow chart illustrating a routine executed in the first and second embodiments, to remove the SOx poisoning of the NOx occlusion-reduction catalyst.

The routine of FIG. 8 is executed by the ECU 30 with a predetermined cycle time. This routine is initiated with step 801 to read in the engine load QJ and speed NE. Then, step 803 is implemented to determine one of the different operating states Ai of the engine 1 (shown in FIG. 2) on the basis of the values QJ and NE.

Then, step 805 is implemented to determine whether the SOx-POISONING flag FSXi corresponding to the present operating state Ai is set at "1", that is, whether the catalyst 7 is suffering from the SOx poisoning in the present operating state Ai. If the catalyst 7 is not suffering from the SOx poisoning, that is, if the flag FSXi is not set at "1", one cycle of execution of the present routine is terminated, without step 807 and the following steps being implemented.

If it is determined in the step 805 that the flag FSXi is set at "1", that is, if the catalyst 7 is suffering from the SOx poisoning in the present operating state Ai of the engine 1, the control flow goes to the step 807 to select one of different SOx-poisoning removing treatments (stoichiometric operation only; switching of the exhaust passage; cylinder-bank control; post-fuel-injection control, etc.) which corresponds to the present operating state Ai. The step 807 is followed by step 809 to determine a lower limit TESi of the exhaust emission temperature corresponding to the present operating state Ai, so that the SOx-poisoning removing treatment is initiated at this lower limit temperature TESi.

Then, the control flow goes to step 811 to determine whether a present temperature TEX of the exhaust emission has reached the lower limit TESi. If the temperature TEX has not reached the lower limit TESi, one cycle of execution of the present routine is terminated. The steps 801–811 are repeatedly implemented until the temperature TEX has increased to the lower limit TESi. Where the STOICHIOMETRIC AIR/FUEL RATIO flag RCi as well as the SOx-POISONING flag FSXi has been set to "1" in the SOx-poisoning determining routine of FIG. 6 or FIG. 7, the engine 1 is operated at the stoichiometric air/fuel ratio while the negative decision is obtained in the step 811 with the exhaust emission temperature TEX being lower than the lower limit TESi, that is, before the SOx-poisoning removing treatment is initiated, or while the SOx-poisoning removing treatment is interrupted due to a drop of the exhaust emission temperature TEX below the lower limit TESi after the temperature TEX is once raised above the lower limit TESi. This operation of the engine 1 at the stoichiometric air/fuel ratio prevents the NOx from being discharged into the atmosphere due to the lowering of the NOx purifying ability of the NOx occlusion-reduction catalyst 7.

If an affirmative decision that the exhaust emission temperature TEX has reached the lower limit TESi is obtained in the step 811, the control flow goes to step 813 to initiate the SOx-poisoning removing treatment of the catalyst 7 selected in the step 807. The SOx-poisoning removing treatment is continued until it is determined in step 815 that the SOx-poisoning removing treatment is completed.

The determination in the step 815 as to whether the SOx-poisoning removing treatment is completed is made by determining whether the temperature of the catalyst 7 raised by the SOx-poisoning removing treatment initiated in the step 813 has been kept above the level of releasing of the SOx for more than a predetermined time, or whether the amount of consumption of the fuel by the engine 1 after the initiation of the SOx-poisoning removing treatment has increased to a predetermined value.

If an affirmative decision that the SOx-poisoning removing treatment is completed is obtained in the step 815, the control flow goes to steps 817 and 819 to reset the SOx-POISONING flags FSXi and the STOICHIOMETRIC AIR/FUEL RATIO flags RCi corresponding to all of the different operating states Ai of the engine 1. Then, the routine is terminated.

As a result, the original NOx purifying ability of the NOx occlusion-reduction catalyst 7 is recovered in each of the operating states Ai of the engine 1, so that the operation of the engine 1 in a lean-burn state is resumed.

In the present embodiment, the lower limit TESi of the exhaust emission temperature above which the SOx-poisoning removing treatment is initiated is set for each operating state Ai. This lower limit TESi may be close to a temperature of the exhaust emission which is eventually established by the stoichiometric operation of the engine 1 in each operating state Ai. In this case, the SOx-poisoning removing treatment is initiated when the actual temperature of the exhaust emission is raised to a predetermined level by the stoichiometric operation of the engine 1 which is initiated upon determination that the catalyst 7 is suffering from the SOx poisoning in a certain operating state Ai of the engine. Although the different lower limits TESi are determined for the different operating states Ai of the engine 1 in the embodiment of FIG. 8, a single common lower limit TES may be used for all of the different operating states Ai.

The present invention permits efficient treatment to remove SOx poisoning of an NOx occlusion-reduction catalyst, while assuring an advantage of minimizing an increase in the fuel consumption of the engine and deterioration of the exhaust emission.

In the illustrated embodiment, a controller (the ECU 30) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the preferred embodiments of the present invention have been described in detail, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An exhaust-emission purifying method comprising the steps of:
    determining a threshold value used to determine whether an NOx purifying catalyst has been poisoned with a specific substance contained in an exhaust emission from the internal combustion engine, the specific substance being a substance other than NOx, the threshold value being selected from a plurality of pre-stored threshold values;
    comparing an NOx purifying ability of the NOx purifying catalyst to purify NOx contained in the exhaust emission with the threshold value, to determine whether the NOx purifying catalyst has been poisoned with the specific substance; and
    releasing the specific substance from the NOx purifying catalyst when it is determined that the NOx purifying catalyst has been poisoned with the specific substance, wherein the threshold value decreases with an increase in load on the internal combustion engine or an increase in an operating speed of the internal combustion engine, and increases with a decrease in the load on the internal combustion engine or a decrease in the operating speed of the internal combustion engine.

2. An exhaust-emission purifying method according to claim 1, wherein the step of releasing the specific substance from the NOx purifying catalyst comprises selecting at least one of a plurality of different poisoning removing operations depending upon an operating condition of the internal combustion engine, and commanding at least the internal combustion engine to effect the poisoning removing treatment of the NOx purifying catalyst by the selected at least one of the plurality of different poisoning removing operations.

3. An exhaust-emission purifying method according to claim 1, wherein an operating condition of the internal combustion engine is divided into a plurality of different operating states, and the threshold value of the NOx purifying ability is set for each of the plurality of different operating states of the internal combustion engine.

4. An exhaust-emission purifying method according to claim 1, wherein the specific substance is SOx.

5. An exhaust-emission purifying method comprising the steps of:
    detecting an operating condition of the internal combustion engine, on the basis of an amount of fuel injection into the internal combustion engine and an operating speed of the internal combustion engine;
    determining a threshold value used to determine whether an NOx purifying catalyst has been poisoned with a specific substance contained in an exhaust emission from the internal combustion engine, the specific substance being a substance other than NOx, such that the threshold value is changed with the detected operating condition of the internal combustion engine;
    comparing an NOx purifying ability of the NOx purifying catalyst to purify NOx contained in the exhaust emission with the threshold value, to determine whether the NOx purifying catalyst has been poisoned with the specific substance; and
    releasing the specific substance from the NOx purifying catalyst when it is determined that the NOx purifying catalyst has been poisoned with the specific substance, wherein the threshold value decreases with an increase in load on the internal combustion engine or an increase in an operating speed of the internal combustion engine, and increases with a decrease in the load on the internal combustion engine or a decrease in the operating speed of the internal combustion engine.

6. An exhaust-emission purifying method according to claim 5, wherein the operating condition of the internal combustion engine is divided into a plurality of different operating states, and the threshold value of the NOx purifying ability is set for each of the plurality of different operating states of the internal combustion engine.

7. An exhaust-emission purifying method according to claim 5, wherein the specific substance is SOx.

8. An exhaust-emission purifying method according to claim 5, wherein the step of releasing the specific substance from the NOx purifying catalyst comprises selecting at least one of a plurality of different poisoning removing operations depending upon the operating condition of the internal combustion engine, and commanding at least the internal combustion engine to effect the poisoning removing treatment of the NOx purifying catalyst by the selected at least one of the plurality of different poisoning removing operations.

9. An exhaust-emission purifying method according to claim 8, wherein the at least one of the plurality of different poisoning removing operations includes at least one of: (1) an operation of the internal combustion engine at a stoichiometric air/fuel ratio; (2) an operation to change a path of flow of the exhaust emission through the exhaust system such that a temperature of the exhaust emission to which the NOx purifying catalyst is exposed is raised; (3) a cylinder-bank control operation of the internal combustion engine wherein at least one of a plurality of groups of cylinders of the internal combustion engine is operated at a fuel-rich air/fuel ratio while the other of the plurality of groups is operated at a fuel-lean air/fuel ratio; and (4) a post-fuel-injection control operation of the internal combustion engine wherein a fuel is injected into cylinders of the internal combustion engine after an intake stroke of the cylinders.

10. An exhaust-emission purifying method according to claim 5, wherein the step of releasing the specific substance from the NOx purifying catalyst comprises commanding at least the internal combustion engine to initiate a poisoning removing treatment of the NOx purifying catalyst to release the specific substance from the NOx purifying catalyst when it is determined that the NOx purifying catalyst has been poisoned with the specific substance, and when a predetermined operating condition of the internal combustion engine is established, the method further comprising a step of commanding the internal combustion engine to be operated at a stoichiometric air/fuel ratio when the predetermined operating condition is not established while it is determined that the NOx purifying catalyst has been poisoned with the specific substance.

11. An exhaust-emission purifying method according to claim 10, wherein the predetermined operating condition is established when a temperature of the exhaust emission is higher than a predetermined lower limit.

12. An exhaust-emission purifying method according to claim 5, wherein the operating condition of the internal combustion engine is divided into a plurality of different operating states defined by respective combinations of an amount of fuel injection into the internal combustion engine and the operating speed of the internal combustion engine, and the threshold value of the NOx purifying ability is set for each of the plurality of different operating states of the internal combustion engine.

13. An exhaust-emission purifying method according to claim 12, wherein the NOx purifying ability is detected on the basis of a concentration of NOx in the exhaust emission, and a determination as to whether the NOx purifying catalyst has been poisoned with the specific substance is effected by comparing the detected concentration of NOx with the threshold value.

14. An exhaust-emission purifying method according to claim 13, further comprising detecting a change in the concentration of NOx, and wherein the step of releasing the specific substance from the NOx purifying catalyst is implemented when a minimum value of the detected concentration of NOx is higher than a predetermined first threshold value and when a maximum value of the detected concentration of NOx is higher than a predetermined second threshold value.

15. An exhaust-emission purifying method according to claim 12, wherein the NOx purifying ability is detected on the basis of a concentration of NOx in the exhaust emission, and a determination as to whether the NOx purifying catalyst has been poisoned with the specific substance is effected by comparing a rich-spike time interval between adjacent rich-spike operations of the internal combustion engine, each effected when the concentration of NOx has reached a predetermined upper limit, with the predetermined threshold value.

16. An exhaust-emission purifying method according to claim 15, further comprising counting a number of consecutive occurrences of the adjacent rich-spike operations, the rich-spike time interval of which is shorter than the predetermined threshold value, and wherein the step of comparing an NOx purifying ability of the NOx purifying catalyst with the threshold value to determine whether the NOx purifying catalyst has been poisoned with the specific substance comprises determining that the NOx purifying catalyst has been poisoned with the specific substance, when the counted number of the consecutive occurrences has increased to a predetermined value.

17. An exhaust-emission purifying method, comprising:
detecting an operating condition of the internal combustion engine, on the basis of an amount of fuel injection into the internal combustion engine and an operating speed of the internal combustion engine;
determining a threshold value used to determine whether an NOx purifying catalyst has been poisoned with a specific substance contained in an exhaust emission from the internal combustion engine, the specific substance being a substance other than NOx, such that the threshold value is changed with the detected operating condition of the internal combustion engine;
comparing an NOx purifying ability of the NOx purifying catalyst to purify NOx contained in the exhaust emission with the threshold value, to determine whether the NOx purifying catalyst has been poisoned with the specific substance;
detecting a change in the concentration of NOx; and
releasing the specific substance from the NOx purifying catalyst when a minimum value of the detected concentration of NOx is higher than a predetermined first threshold value and when a maximum value of the detected concentration of NOx is higher than a predetermined second threshold value.

18. An exhaust-emission purifying method, comprising:
detecting an operating condition of the internal combustion engine, on the basis of an amount of fuel injection into the internal combustion engine and an operating speed of the internal combustion engine;
determining a threshold value used to determine whether an NOx purifying catalyst has been poisoned with a specific substance contained in an exhaust emission from the internal combustion engine, the specific substance being a substance other than NOx, such that the threshold value is changed with the detected operating condition of the internal combustion engine;
counting a number of consecutive occurrences of adjacent rich-spike operations of the internal combustion engine, a rich-spike time interval of which is shorter than a predetermined threshold value;
comparing an NOx purifying ability of the NOx purifying catalyst with the threshold value to determine whether the NOx purifying catalyst has been poisoned with the specific substance; and
releasing the specific substance from the NOx purifying catalyst when the counted number of the consecutive occurrences has increased to a predetermined value.

19. An exhaust-emission purifying apparatus for an internal combustion engine, comprising:
an NOx purifying catalyst disposed in an exhaust system of the internal combustion engine, and operable to purify NOx contained in an exhaust emission from the internal combustion engine; and
a controller operable to detect an NOx purifying ability of the NOx purifying catalyst, (i) the controller comparing the detected NOx purifying ability with a predetermined threshold value to determine the NOx purifying ability of the NOx purifying catalyst is below the threshold, (ii) the predetermined threshold value being changed with an operating condition of the internal combustion engine, (iii) the controller commanding at least the internal combustion engine to effect a treatment of the NOx purifying catalyst when the controller determines that the NOx purifying ability of the NOx purifying catalyst is below the threshold, wherein the threshold value decreases with an increase in load on the internal combustion engine or an increase in an operating speed of the internal combustion engine, and increases with a decrease in the load on the internal combustion engine or a decrease in the operating speed of the internal combustion engine.

20. An exhaust-emission purifying apparatus for an internal combustion engine, comprising:
an NOx purifying catalyst disposed in an exhaust system of the internal combustion engine, and operable to purify NOx contained in an exhaust emission from the internal combustion engine and to hold a specific substance in the exhaust emission, in addition to NOx, by adsorption or absorption of the specific substance, an NOx purifying ability of the NOx purifying catalyst to purify the NOx being lowered with an increase in an amount of the specific substance held by the catalyst; and
a controller operable to detect the NOx purifying ability of the NOx purifying catalyst, (i) the controller comparing the detected NOx purifying ability with a predetermined threshold value to determine whether the NOx purifying catalyst has been poisoned with the specific substance, (ii) the predetermined threshold value being changed with an operating condition of the internal combustion engine, (iii) the controller commanding at least the internal combustion engine to effect a poisoning removing treatment of the NOx purifying catalyst, for releasing the specific substance from the NOx purifying catalyst, when the controller determines that the NOx purifying catalyst has been poisoned with the specific substance, wherein the threshold value decreases with an increase in load on the internal combustion engine or an increase in an operating speed of the internal combustion engine, and increases with a decrease in the load on the internal combustion engine or a decrease in the operating speed of the internal combustion engine.

21. An exhaust-emission purifying apparatus according to claim 20, wherein the operating condition of the internal combustion engine is divided into a plurality of different operating states, and the threshold value of the NOx purifying ability is set for each of the plurality of different operating states of the internal combustion engine.

22. An exhaust-emission purifying apparatus according to claim 20, wherein the specific substance is SOx.

23. An exhaust-emission purifying apparatus according to claim 20, wherein the controller selects at least one of a plurality of different poisoning removing operations depending upon the operating condition of the internal combustion engine, and commands at least the internal combustion engine to perform the selected at least one of the plurality of different poisoning removing operations, to effect the poisoning removing treatment of the NOx purifying catalyst.

24. An exhaust-emission purifying apparatus according to claim 23, wherein the at least one of the plurality of different poisoning removing operations includes at least one of: (1) an operation of the internal combustion engine at a stoichiometric air/fuel ratio; (2) an operation to change a path of flow of the exhaust emission through the exhaust system such that a temperature of the exhaust emission to which the NOx purifying catalyst is exposed is raised; (3) a cylinder-bank control operation of the internal combustion engine wherein at least one of a plurality of groups of cylinders of the internal combustion engine is operated at a fuel-rich air/fuel ratio while the other of the plurality of groups is operated at a fuel-lean air/fuel ratio; and (4) a post-fuel-injection control operation of the internal combustion engine wherein a fuel is injected into cylinders of the internal combustion engine after an intake stroke of the cylinders.

25. An exhaust-emission purifying apparatus according to claim 20, wherein the controller commands at least the internal combustion engine to initiate the poisoning removing treatment of the NOx purifying catalyst when the controller determines that the NOx purifying catalyst has been poisoned with the specific substance, and when a predetermined operating condition of the internal combustion engine is established, the controller commanding the internal combustion engine to be operated at a stoichiometric air/fuel ratio when the predetermined operating condition is not established while the controller determines that the NOx purifying catalyst has been poisoned with the specific substance.

26. An exhaust-emission purifying apparatus according to claim 25, wherein the predetermined operating condition is established when a temperature of the exhaust emission is higher than a predetermined lower limit.

27. An exhaust-emission purifying apparatus according to claim 20, wherein the operating condition of the internal combustion engine is divided into a plurality of different operating states defined by respective combinations of an amount of fuel injection into the internal combustion engine and the operating speed of the internal combustion engine, and the threshold value of the NOx purifying ability is set for each of the plurality of different operating states of the internal combustion engine.

28. An exhaust-emission purifying apparatus according to claim 27, wherein the controller detects the NOx purifying ability on the basis of a concentration of NOx in the exhaust emission, and determines whether the NOx purifying catalyst has been poisoned with the specific substance, by comparing the detected concentration of NOx with the predetermined threshold value.

29. An exhaust-emission purifying apparatus according to claim 27, wherein the controller detects the NOx purifying ability on the basis of a concentration of NOx in the exhaust emission, and determines whether the NOx purifying catalyst has been poisoned with the specific substance, by comparing a rich-spike time interval between adjacent rich-spike operations of the internal combustion engine, each effected when the concentration of NOx has reached a predetermined limit, with a predetermined interval used as the threshold value.

30. An exhaust-emission purifying apparatus for an internal combustion engine, comprising:

an NOx purifying catalyst disposed in an exhaust system of the internal combustion engine, and operable to purify NOx contained in an exhaust emission from the internal combustion engine and to hold a specific substance in the exhaust emission, the specific substance being a substance in addition to NOx, by adsorption or absorption of the specific substance, an NOx purifying ability of the NOx purifying catalyst to purify the NOx being lowered with an increase in an amount of the specific substance held by the catalyst; and a controller operable to detect the NOx purifying ability of the NOx purifying catalyst, (i) the controller comparing the detected NOx purifying ability with a predetermined threshold value to determine whether the NOx purifying catalyst has been poisoned with the specific substance, (ii) the predetermined threshold value being selected from a plurality of available threshold values, (iii) the controller commanding at least the internal combustion engine to effect a poisoning removing treatment of the NOx purifying catalyst, for releasing the specific substance from the NOx purifying catalyst, when the controller determines that the NOx purifying catalyst has been poisoned with the specific substance, wherein the threshold value decreases with an increase in load on the internal combustion engine or an increase in an operating speed of the internal combustion engine, and increases with a decrease in the load on the internal combustion load or a decrease in the operating speed of the internal combustion engine.

31. An exhaust-emission purifying apparatus according to claim 30, wherein the controller selects at least one of a plurality of different poisoning removing operations depending upon an operating condition of the internal combustion engine, and commands at least the internal combustion engine to perform the selected at least one of the plurality of different poisoning removing operations, to effect the poisoning removing treatment of the NOx purifying catalyst.

32. An exhaust-emission purifying apparatus according to claim 30, wherein an operating condition of the internal combustion engine is divided into a plurality of different operating states, and the threshold value of the NOx purifying ability is set for each of the plurality of different operating states of the internal combustion engine.

33. An exhaust-emission purifying apparatus according to claim 30, wherein the specific substance is SOx.

* * * * *